US012523420B2

(12) United States Patent
Choi

(10) Patent No.: US 12,523,420 B2
(45) Date of Patent: Jan. 13, 2026

(54) REFRIGERATOR

(71) Applicant: LG ELECTRONICS INC., Seoul (KR)

(72) Inventor: Heungsik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/021,525

(22) PCT Filed: Aug. 9, 2021

(86) PCT No.: PCT/KR2021/010516
§ 371 (c)(1),
(2) Date: Feb. 15, 2023

(87) PCT Pub. No.: WO2022/039428
PCT Pub. Date: Feb. 24, 2022

(65) Prior Publication Data

US 2024/0019190 A1 Jan. 18, 2024

(30) Foreign Application Priority Data

Aug. 19, 2020 (KR) ........................ 10-2020-0103914

(51) Int. Cl.

| | |
|---|---|
| ***F25D 31/00*** | (2006.01) |
| ***A23B 2/80*** | (2025.01) |
| ***F25D 17/06*** | (2006.01) |
| ***F25D 23/12*** | (2006.01) |
| ***F25D 29/00*** | (2006.01) |

(52) U.S. Cl.
CPC .............. *F25D 31/005* (2013.01); *A23B 2/80* (2025.01); *F25D 17/065* (2013.01); *F25D 23/12* (2013.01); *F25D 29/005* (2013.01); *F25D 2317/061* (2013.01); *F25D 2400/02* (2013.01)

(58) Field of Classification Search
CPC ........... A23B 2/00; A23B 2/80; F25D 17/065; F25D 23/12; F25D 29/0055; F25D 31/005
See application file for complete search history.

(56) References Cited

FOREIGN PATENT DOCUMENTS

| | | | |
|---|---|---|---|
| JP | 4948562 | B2 | 6/2012 |
| KR | 10-0756712 | B1 | 9/2007 |
| KR | 10-1652513 | B1 | 9/2016 |
| WO | 2010071325 | A1 | 6/2010 |

OTHER PUBLICATIONS

CN 110671876 (English Translation) (Year: 2020).*
JP 498562 (English translation) (Year: 2012).*

* cited by examiner

*Primary Examiner* — Jonathan Bradford
(74) *Attorney, Agent, or Firm* — Bryan Cave Leighton Paisner LLP

(57) ABSTRACT

A refrigerator includes a first storage compartment, a cavity, a heat source, a cold source, a water molecule freezing preventing device, and a controller configured to perform a first operation based on a first notch temperature for a first cooling operation, a second operation based on a second notch temperature for a heating operation, and a third operation based on a third notch temperature for a second cooling operation, where the second notch temperature is higher than 0° C., and the third notch temperature is lower than the first notch temperature.

20 Claims, 27 Drawing Sheets

(a)

(b)

REFRIGERATOR

This application is the National Stage filing under 35 U.S.C. 371 of International Application No. PCT/KR2021/010516, filed on Aug. 9, 2021, which claims the benefit of Korean Patent Application No. 10-2020-0103914, filed on Aug. 19, 2020, the contents of which are all hereby incorporated by reference herein in their entirety.

BACKGROUND

1. Field of Disclosure

The present disclosure relates to a refrigerator, and more particularly, to a refrigerator capable of efficiently supplying cold or heat until reaching a supercooling maintaining section.

2. Background

For long term storage of meat, fish, and the like, a freezer compartment in a refrigerator maintains a temperature of approximately −18° C.

Meanwhile, when cooking meat, fish, etc. frozen at a temperature of approximately −18° C., separate thawing is required. Accordingly, after the frozen meat, fish, etc. are taken out from the freezer compartment, thawing is performed using a separate cooking utensil. Therefore, there is an inconvenience in that a separate thawing is performed using another utensil.

Korean Patent Publication No. 10-2008-0003218 (hereinafter, referred to as "Document 1") discloses a supercooling apparatus including a non-freezer compartment for storing food in a non-freezing supercooling state and an electrode for applying an electric field to the non-freezer compartment.

According to Document 1, the supercooling apparatus performs as a heater when a current is applied, which increases an internal temperature of the non-freezer compartment to increase a temperature of food that is maintained at a low temperature. On the other hand, when the current is not applied, the internal temperature of the non-freezer compartment decreases to a low temperature again. However, there is a problem in that the food cannot be stored for a long period because the temperature change occurs repeatedly.

In addition, the temperature increase occurs around the heater due to the operation of the heater. As such, there is a problem in that the temperature change does not occur evenly around the food.

Korean Patent Registered Patent Publication No. 10-0756712 (hereinafter, referred to as "Document 2") discloses a method for determining a release of a supercooling state of a refrigerator.

According to Document 2, in order to detect a temperature of an object, a temperature sensor that measures the temperature is placed inside a supercooling chamber. However, because an electric field or magnetic field occurs in the supercooling chamber, a malfunction of the temperature sensor and a circuit around the temperature sensor may occur. Accordingly, there is a problem in that it is difficult to accurately detect the temperature of the object.

In addition, according to Document 2, there is no method to efficiently maintain supercooling, so there is a disadvantage in that power consumption may be considerable.

SUMMARY

The present disclosure provides a refrigerator capable of efficiently supplying cold or heat until reaching a supercooling maintaining section.

The present disclosure further provides a refrigerator capable of efficiently maintaining supercooling using a radio frequency (RF) output without placing a temperature detector in a cavity.

The present disclosure further provides a refrigerator capable of efficiently supplying cold in a second supercooling section of a first supercooling section and the second supercooling section.

The present disclosure further provides a refrigerator capable of stably securing a supercooling section using an RF output.

According to an embodiment of the present disclosure, there is provided a refrigerator including: a first storage compartment in which goods are stored; a cavity disposed inside the first storage compartment; a heat source configured to supply heat to the cavity; a cold source configured to supply cold to the cavity; a water molecule freezing preventing device configured to prevent freezing of water contained in the goods; and a controller configured to control an output of at least one of the heat source, the cold source, or the water molecule freezing preventing device.

The controller is configured to perform a first operation based on a first notch temperature for a first cooling operation of the first storage compartment, a second operation based on a second notch temperature for a heating operation of the first storage compartment, and a third operation based on a third notch temperature for a second cooling operation of the first storage compartment.

The second notch temperature is than 0° C., and the third notch temperature is higher than the first notch temperature.

The cold source may include an evaporator configured to perform heat exchange using a refrigerant compressed by a compressor.

The cold source may include a fan operated to supply cold generated by the heat exchange in the evaporator to the first storage compartment.

The cold source may include a heat absorption surface of a thermoelectric element.

The cold source may further include a fan operated to supply cold generated by heat exchange on a heat absorption surface of the thermoelectric element to the cavity.

The heat source may include at least one of a heater or an RF output device.

The water molecule freezing preventing device may include at least one of an RF output device, an electric field output device, a magnetic field output device, or an ultrasonic output device.

An operation mode of the first storage compartment may be changed, and the operation mode may include at least one of a refrigerating operation mode, a supercooling operation mode, or a thawing mode.

A notch temperature of the first storage compartment in the refrigerating operation mode may be higher than a notch temperature of the first storage compartment in the supercooling operation mode.

A notch temperature of the first storage compartment in the refrigerating operation mode may be lower than a notch temperature of the first storage compartment in the thawing mode.

The refrigerator may further include a second storage compartment disposed outside the first storage compartment A notch temperature of the second storage compartment may be higher than a notch temperature for the cooling operation of the first storage compartment.

The refrigerator may further include a third storage compartment, and a notch temperature for the third storage compartment may be lower than the notch temperature for the cooling operation of the first storage compartment.

The controller may be configured to control an output of the water molecule freezing preventing device during execution of the second operation to be greater than an output of the water molecule freezing preventing device during execution of the first operation.

An output of the water molecule freezing preventing device during execution of the first operation may be zero.

The controller may be configured to control an output of the water molecule freezing preventing device during execution of the third operation to be equal to or greater than an output of the water molecule freezing preventing device during execution of the first operation.

The controller may be configured to further perform a fourth operation based on a fourth notch temperature for the heating operation of the first storage compartment.

The fourth notch temperature may be higher than 0° C.

The controller may be configured to control the fourth notch temperature to be higher than the second notch temperature when a time elapsed from a time when an operation start condition of the second operation is satisfied to a time when an operation end condition of the second operation is satisfied exceeds a predetermined range.

The controller may be configured to control the fourth notch temperature to be equal to the second notch temperature when a time elapsed from a time when an operation start condition of the second operation is satisfied to a time when an operation end condition of the second operation is satisfied is within a predetermined range.

The controller may be configured to control the fourth notch temperature to be lower than the second notch temperature when a time elapsed from a time when an operation start condition of the second operation is satisfied to a time when an operation end condition of the second operation is satisfied is less than a predetermined range.

The controller is configured to control the fourth notch temperature to be higher than the second notch temperature when a temperature of the first storage compartment exceeds a predetermined range from a time when an operation start condition of the second operation is satisfied to a time when an operation end condition of the second operation is satisfied.

The controller may be configured to control the fourth notch temperature to be equal to the second notch temperature when a temperature of the first storage compartment is within a predetermined range from a time when an operation start condition of the second operation is satisfied to a time when an operation end condition of the second operation is satisfied.

The controller may be configured to control the fourth notch temperature to be lower than the second notch temperature when the temperature of the first storage compartment is less than the predetermined range from the time when the operation start condition of the second operation is satisfied to the time when the operation end condition of the second operation is satisfied.

According to another embodiment of the present disclosure, there is provided a refrigerator including: a first storage compartment in which goods are stored; a cavity disposed inside the first storage compartment; a heat source configured to supply heat to the cavity; a cold source configured to supply cold to the cavity; a water molecule freezing preventing device configured to prevent freezing of water contained in the goods; and a controller configured to control an output of at least one of the heat source, the cold source, or the water molecule freezing preventing device.

The controller executes a control to execute a first operation based on a first notch temperature for a first cooling operation of the first storage compartment, a second operation based on a second notch temperature for a heating operation of the first storage compartment, and a third operation based on a third notch temperature for a third cooling operation of the first storage compartment.

The controller is configured to control a total amount of cold supplied to the first storage compartment in the third operation to be greater than a total amount of cold supplied to the first storage compartment in the first operation.

According to yet another embodiment of the present disclosure, there is provided a refrigerator including: a cavity which is disposed in a supercooling chamber and in which goods are placed, an inlet temperature detector configured to detect an inlet temperature of the cavity, an outlet temperature detector configured to detect an outlet temperature of the cavity, a cold supply device configured to supply or block cold to the cavity, a heat supply device configured to supply or block heat to the cavity, and a controller configured to control the cold supply device and the heat supply device.

The heat supply device includes an RF output device that outputs an RF to the cavity.

The controller may be configured to supply the cold to the cavity during a first section, supply heat to the cavity during a second section after the first section when the supercooling state of the goods is released, supply the cold to the cavity, and supply the heat to the cavity during a third section after the second section when thawing of the goods ends.

The controller is configured to control an intensity of the cold during the third section to be less than an intensity of the cold during the first section.

During the first section, the temperature of the goods may sequentially decrease to the first temperature which is a supercooling set temperature, and during the second section, the temperature of the goods may increase from the first temperature to a second temperature which is a thawing completion temperature. Moreover, during the third section, the temperature of the goods may decrease from the second temperature to a third temperature higher than the first temperature.

The controller may be configured to supply the heat to the cavity using an RF output by operating the RF output device.

The controller may be configured to maintain the temperature of the goods within a predetermined range based on the third temperature during the fourth section after the third section.

The controller may be configured to supply the heat to the cavity and control the supply of the heat to be turned on or off repeatedly during the fourth section.

The controller may be configured to control a first heat supply period of the fourth second to be longer than the remaining heat supply periods.

The controller may be configured to not supply the cold to the cavity during the second section.

The controller may be configured to supply heat having an intensity less than an intensity of the heat during the second section to the cavity during the first section.

The controller may be configured to control a temperature change rate of the goods during the third section to be less than a temperature change rate of the goods during the first section.

The controller may be configured to control the intensity of the heat during the third section to be less than the intensity of the heat during the second section.

The cold supply device may include a fan placed at the inlet of the cavity.

The supercooling chamber may further include a partition wall separating an inlet of the supercooling chamber and an outlet of the supercooling chamber.

The controller may control the supply of the cold supplied to the cavity through on/off control of the fan.

The cold supply device may further include a cold supply duct configured to supply cold to the inlet of the supercooling chamber, and a damper configured to operate to supply the cold to the cold supply duct.

The controller may control the supply of cold supplied to the supercooling chamber by controlling an opening or opening rate of a damper.

When the supercooling chamber is disposed in the refrigerating compartment, the cold supply device may further include a cold supply duct in a freezer compartment that supplies cold to the inlet of the supercooling chamber and a cold recovery duct in the freezer compartment that collects the cold from the outlet of the supercooling chamber.

The controller may determine that the supercooling state of the goods is released when a first change rate, which is the difference between the outlet temperature and the inlet temperature of the cavity during the operation of the fan, is equal to or more than a first reference value, and a second change rate, which is the difference between the outlet temperature and inlet temperature of the cavity when the fan is turned off, is equal to or more than a second reference value.

The controller may determine that the thawing of the goods ends when the difference between the outlet temperature and the inlet temperature of the cavity when the fan is off is greater than zero, and the second change rate, which is the difference between the outlet temperature and the inlet temperature of the cavity when the fan is off, is equal to or more than the second reference value.

According to yet another embodiment of the present disclosure, there is provided a refrigerator including: a cavity which is disposed in a supercooling chamber and in which goods are placed, an inlet temperature detector configured to detect an inlet temperature of the cavity, an outlet temperature detector configured to detect an outlet temperature of the cavity, a cold supply device configured to supply or block cold to the cavity, an RF output device configured to output an RF to the cavity, and a controller configured to control the cold supply device and the heat supply device.

The controller may be configured to supply the cold to the cavity during a first section, supply the RF to the cavity during a second section after the first section when the supercooling state of the goods is released, supply the cold to the cavity, and supply the RF to the cavity during a third section after the second section when thawing of the goods ends.

The controller may be configured to control an intensity of the cold during the third section to be less than an intensity of the cold during the first section.

The controller may be configured to maintain the temperature of the goods within a predetermined range based on the third temperature and control the output of the heat to be turned on or off repeatedly during the fourth section after the third section.

According to yet another embodiment of the present disclosure, there is provided a refrigerator including: a cavity which is disposed in a supercooling chamber and in which goods are placed, an inlet temperature detector configured to detect an inlet temperature of the cavity, an outlet temperature detector configured to detect an outlet temperature of the cavity, a cold supply device configured to supply or block cold to the cavity, a heat supply device configured to supply or block heat to the cavity, and a controller configured to control the cold supply device and the heat supply device.

The heat supply device includes an RF output device that outputs an RF to the cavity.

The controller may be configured to supply the cold to the cavity during a first section, supply heat to the cavity during a second section after the first section when the supercooling state of the goods is released, supply the cold to the cavity, and supply the heat to the cavity during a third section after the second section when thawing of the goods ends.

The controller is configured to control an intensity of the cold during the third section to be less than an intensity of the cold during the first section.

During the first section, the temperature of the goods may sequentially decrease to the first temperature which is a supercooling set temperature, and during the second section, the temperature of the goods may increase from the first temperature to a second temperature which is a thawing completion temperature. Moreover, during the third section, the temperature of the goods may decrease from the second temperature to a third temperature higher than the first temperature.

The controller may be configured to supply the heat to the cavity using an RF output by operating the RF output device.

The controller may be configured to maintain the temperature of the goods within a predetermined range based on the third temperature during the fourth section after the third section.

The controller may be configured to supply the heat to the cavity and control the supply of the heat to be turned on or off repeatedly during the fourth section.

The controller may be configured to control a first heat supply period of the fourth section to be longer than the remaining heat supply periods.

The controller may be configured not to supply the cold to the cavity during the second section.

The controller may be configured to supply heat having an intensity less than an intensity of the heat during the second section to the cavity during the first section.

The controller may be configured to control a temperature change rate of the goods during the third section to be less than a temperature change rate of the goods during the first section.

The controller may be configured to control the intensity of the heat during the third section to be less than the intensity of the heat during the second section.

The cold supply device may include a fan placed at the inlet of the cavity.

The supercooling chamber may further include a partition wall separating an inlet of the supercooling chamber and an outlet of the supercooling chamber.

The controller may control the supply of the cold supplied to the cavity through on/off control of the fan.

The cold supply device may further include a cold supply duct configured to supply cold to the inlet of the supercooling chamber, and a damper configured to operate to supply the cold to the cold supply duct.

The controller may control the supply of cold supplied to the supercooling chamber by controlling an opening or opening rate of a damper.

When the supercooling chamber is disposed in the refrigerating compartment, the cold supply device may further include a cold supply duct in a freezer compartment that supplies cold to the inlet of the supercooling chamber and a cold recovery duct in the freezer compartment that collects the cold from the outlet of the supercooling chamber.

The controller may determine that the supercooling state of the goods is released when a first change rate, which is the difference between the outlet temperature and the inlet temperature of the cavity during the operation of the fan, is equal to or more than a first reference value, and a second change rate, which is the difference between the outlet temperature and inlet temperature of the cavity when the fan is turned off, is equal to or more than a second reference value.

The controller may determine that the thawing of the goods ends when the difference between the outlet temperature and the inlet temperature of the cavity when the fan is off is greater than zero, and the second change rate, which is the difference between the outlet temperature and the inlet temperature of the cavity when the fan is off, is equal to or more than the second reference value.

According to yet another embodiment of the present disclosure, there is provided a refrigerator including: a cavity which is disposed in a supercooling chamber and in which goods are placed, an inlet temperature detector configured to detect an inlet temperature of the cavity, an outlet temperature detector configured to detect an outlet temperature of the cavity, a cold supply device configured to supply or block cold to the cavity, an RF output device configured to output an RF to the cavity, and a controller configured to control the cold supply device and the heat supply device.

The controller may be configured to supply the cold to the cavity during a first section, output the RF to the cavity during a second section after the first section when the supercooling state of the goods is released, supply the cold to the cavity, and output the RF to the cavity during a third section after the second section when thawing of the goods ends.

The controller may be configured to control an intensity of the cold during the third section to be less than an intensity of the cold during the first section.

The controller may be configured to maintain the temperature of the goods within a predetermined range based on the third temperature and the output of the RF is turned on or off repeatedly during the fourth section after the third section.

The controller of the embodiment of the present disclosure may be configured to perform the first operation based on the first notch temperature for the first cooling operation of the first storage compartment, the second operation based on the second notch temperature for the heating operation of the first storage compartment, and the third operation based on the third notch temperature for the cooling operation of the first storage compartment. Accordingly, it may be possible to effectively supply the cold or heat until reaching the supercooling maintaining section.

Preferably, according to the controller, the second notch temperature to be higher than 0° C., and the third notch temperature to be lower than the first notch temperature. Accordingly, it may be possible to effectively supply the cold or heat until reaching the supercooling maintaining section.

The operation mode of the first storage compartment may be changed, and the operation mode may include at least one of the refrigerating operation mode, the supercooling operation mode, or the thawing mode. Accordingly, it may be possible to effectively supply the cold or heat until reaching the supercooling maintaining section.

The notch temperature of the first storage compartment in the refrigerating operation mode may be higher than the notch temperature of the first storage compartment in the supercooling operation mode. Therefore, it may be possible to effectively supply the cold or heat until reaching the supercooling maintaining section.

The notch temperature of the first storage compartment in the refrigerating operation mode may be lower than the notch temperature of the first storage compartment in the thawing mode. Therefore, it may be possible to effectively supply the cold or heat until reaching the supercooling maintaining section.

The notch temperature of the second storage compartment may be higher than the notch temperature for the cooling operation of the first storage compartment. Therefore, it may be possible to effectively supply the cold or heat until reaching the supercooling maintaining section.

The refrigerator according to the embodiment of the present disclosure may further include the third storage compartment, and the notch temperature for the third storage compartment may be lower than the notch temperature for the cooling operation of the first storage compartment. Therefore, it may be possible to effectively supply the cold or heat until reaching the supercooling maintaining section.

The controller may be configured to control the output of the water molecule freezing preventing device during the execution of the second operation to be greater than the output of the water molecule freezing preventing device during the execution of the first operation. Therefore, in the first operation, power consumption by the water molecule freezing preventing device may be reduced.

The output of the water molecule freezing preventing device during execution of the first operation may be zero. Accordingly, the power consumption by the water molecule freezing preventing device may be reduced.

The controller may be configured to control the output of the water molecule freezing preventing device during the execution of the third operation to be equal to or greater than the output of the water molecule freezing preventing device during the execution of the first operation. Accordingly, in the operation section, the power consumption by the water molecule freezing preventing device may be reduced.

The controller may be configured to further perform the fourth operation based on the fourth notch temperature for the heating operation of the first storage compartment. Therefore, the thawing mode may be performed.

The controller may be configured to control the fourth notch temperature to be higher than the second notch temperature when the time elapsed from the time when the operation start condition of the second operation is satisfied to the time when the operation end condition of the second operation is satisfied exceeds a predetermined range. Accordingly, it may be possible to effectively supply the cold or heat until reaching the supercooling maintaining section.

The controller may be configured to control the fourth notch temperature to be equal to the second notch temperature when the time elapsed from the time when the operation start condition of the second operation is satisfied to the time when the operation end condition of the second operation is satisfied is within a predetermined range. Accordingly, it may be possible to effectively supply the cold or heat until reaching the supercooling maintaining section.

The controller may be configured to control the fourth notch temperature to be lower than the second notch temperature when the time elapsed from the time when the operation start condition of the second operation is satisfied to the time when the operation end condition of the second operation is satisfied is less than a predetermined range. Accordingly, it may be possible to effectively supply the cold or heat until reaching the supercooling maintaining section.

The controller may be configured to control the fourth notch temperature to be higher than the second notch temperature when the temperature of the first storage compartment exceeds the predetermined range from the time when the operation start condition of the second operation is satisfied to the time when the operation end condition of the second operation is satisfied. Accordingly, it may be possible to effectively supply the cold or heat until reaching the supercooling maintaining section.

The controller may be configured to control the fourth notch temperature to be equal to the second notch temperature when the temperature of the first storage compartment is within the predetermined range from the time when the operation start condition of the second operation is satisfied to the time when the operation end condition of the second operation is satisfied. Accordingly, it may be possible to effectively supply the cold or heat until reaching the supercooling maintaining section.

The controller may be configured to control the fourth notch temperature to be lower than the second notch temperature when the temperature of the first storage compartment is less than the predetermined range from the time when the operation start condition of the second operation is satisfied to the time when the operation end condition of the second operation is satisfied. Accordingly, it may be possible to effectively supply the cold or heat until reaching the supercooling maintaining section.

The controller in the refrigerator according to another embodiment of the present disclosure may be configured to execute the first operation based on a first notch temperature for a first cooling operation of a first storage compartment, a second operation based on a second notch temperature for a heating operation of the first storage compartment, and a third operation based on a third notch temperature for a second cooling operation of the first storage compartment. Accordingly, it may be possible to effectively supply the cold or heat until reaching the supercooling maintaining section.

The controller is configured to control the total amount of cold supplied to the first storage compartment in the third operation to be greater than the total amount of cold supplied to the first storage compartment in the first operation. Accordingly, it may be possible to effectively supply the cold or heat until reaching the supercooling maintaining section.

The controller in the refrigerator according to yet another embodiment of the present disclosure may be configured to execute the first operation based on a first notch temperature for a first cooling operation of a first storage compartment, a second operation based on a second notch temperature for a heating operation of the first storage compartment, and a third operation based on a third notch temperature for a second cooling operation of the first storage compartment. Accordingly, it may be possible to effectively supply the cold or heat until reaching the supercooling maintaining section.

The controller is configured to control the output of the water molecule freezing preventing device in the third operation to be greater than or equal to an output of the water molecule freezing preventing device in the first operation. Accordingly, it may be possible to effectively supply the cold or heat until reaching the supercooling maintaining section.

BRIEF DESCRIPTION OF THE DRAWINGS

The above aspects and other aspects, features and advantages of the present disclosure may become more apparent from the following detailed description in conjunction with the accompanying drawings, in which.

DETAILED DESCRIPTION OF THE PREFERRED EMBODIMENTS

Exemplary embodiments of the present disclosure are described with reference to the accompanying drawings in detail.

The suffixes "module" and "unit" in elements used in description below are given only in consideration of ease in preparation of the specification and do not have specific meanings or functions. Therefore, the suffixes "module" and "unit" may be used interchangeably.

Figure 1:
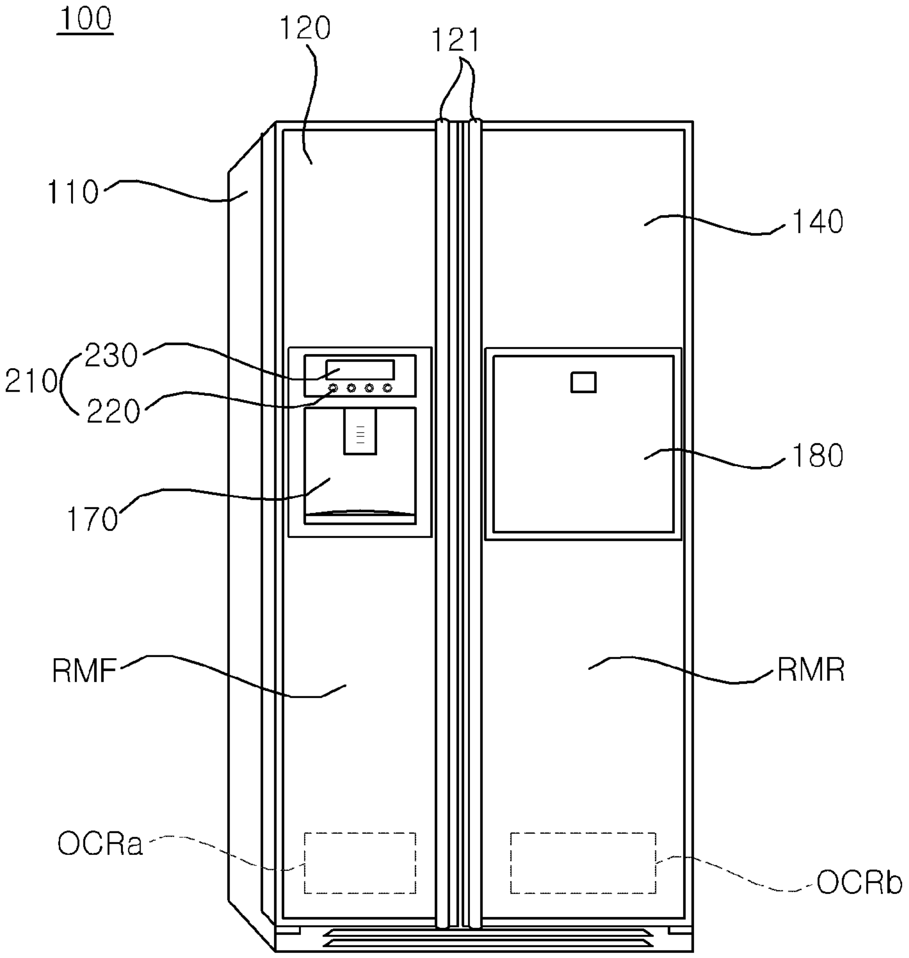
FIG. 1 is a perspective view illustrating a refrigerator according to an embodiment of the present disclosure.

FIG. 1 is a perspective view illustrating a refrigerator according to an embodiment of the present disclosure.

Referring to FIG. 1, an outer appearance of the refrigerator 100 according to an embodiment of the present disclosure is formed by a case 110 having an inner space partitioned into a freezer compartment RMF and a refrigerating compartment RMR, a freezer compartment door 120 for closing the freezer compartment RMF, and a refrigerating compartment door 140 for closing the refrigerating compartment RMR.

In addition, the front surfaces of the freezer compartment door 120 and the refrigerating compartment door 140 are further provided with a door handle 121 protruding forward, so that a user can easily grip and open the freezer compartment door 120 and the refrigerating compartment door 140.

Meanwhile, the front surface of the refrigerating compartment door 140 may be further provided with a home bar 180 which is a convenient means for allowing a user to take out a stored object such as a beverage stored therein without opening the refrigerating compartment door 140.

In addition, the front surface of the freezer compartment door 120 may be provided with a dispenser 170 which is a convenient means for allowing the user to easily take out ice or drinking water without opening the freezer compartment door 120, and a control panel 210 for controlling the driving operation of the refrigerator 100 and displaying the state of the refrigerator 100 being operated on a screen may be further provided in an upper side of the dispenser 170.

Meanwhile, in the drawing, it is illustrated that the dispenser 170 is disposed in the front surface of the freezer compartment door 120, but is not limited thereto, and may be disposed in the front surface of the refrigerating compartment door 140.

Meanwhile, a supercooling chamber OCRa capable of maintaining freshness without freezing goods by using the cold of the freezer compartment may be disposed in the upper or lower portion of the freezer compartment RMF.

Alternatively, it is also possible to place a supercooling chamber OCRb in which goods are not frozen and freshness may be maintained by using the cold of the freezer compartment or the refrigerating compartment at the upper or lower portion of the refrigerating compartment RMR.

The supercooling chamber OCRa or OCRb in the present disclosure is used for a supercooling state in which goods are not turned to a solid state and maintain a liquid state in a state where the supplied cold has a temperature at which a phase change from liquid to solid occurs, for example, a temperature equal to or less than 0° C.

The control panel 210 may include an input device 220 having a plurality of buttons, and a display device 230 for displaying in a control screen, an operation state, and the like.

The display device 230 displays information such as a control screen, an operation state, a temperature inside the refrigerator, and the like. For example, the display device 230 may display the set temperature of the freezer compartment and the set temperature of the refrigerating compartment.

The display device 230 may be implemented in various ways, such as a liquid crystal display (LCD), a light emitting diode (LED), an organic light emitting diode (OLED), and the like. In addition, the display device 230 may be implemented as a touch screen capable of serving as the input device 220.

The input device 220 may include a plurality of operation buttons. For example, the input device 220 may include a freezer compartment temperature setting button (not illustrated) for setting the freezer compartment temperature, and a refrigerating compartment temperature setting button (not illustrated) for setting the refrigerating compartment temperature. Meanwhile, the input device 220 may be implemented in a touch screen that may also serve as the display device 230.

Meanwhile, the refrigerator based on the embodiment of the present disclosure is not limited to a double door type as illustrated in the drawing, but may be one of a door type, a sliding door type, a curtain door type, and the like. Furthermore, regardless of its type, as will be described later, it may be sufficient that the RF output device 190*a* for outputting an RF is disposed inside the freezer compartment.

Figure 2:
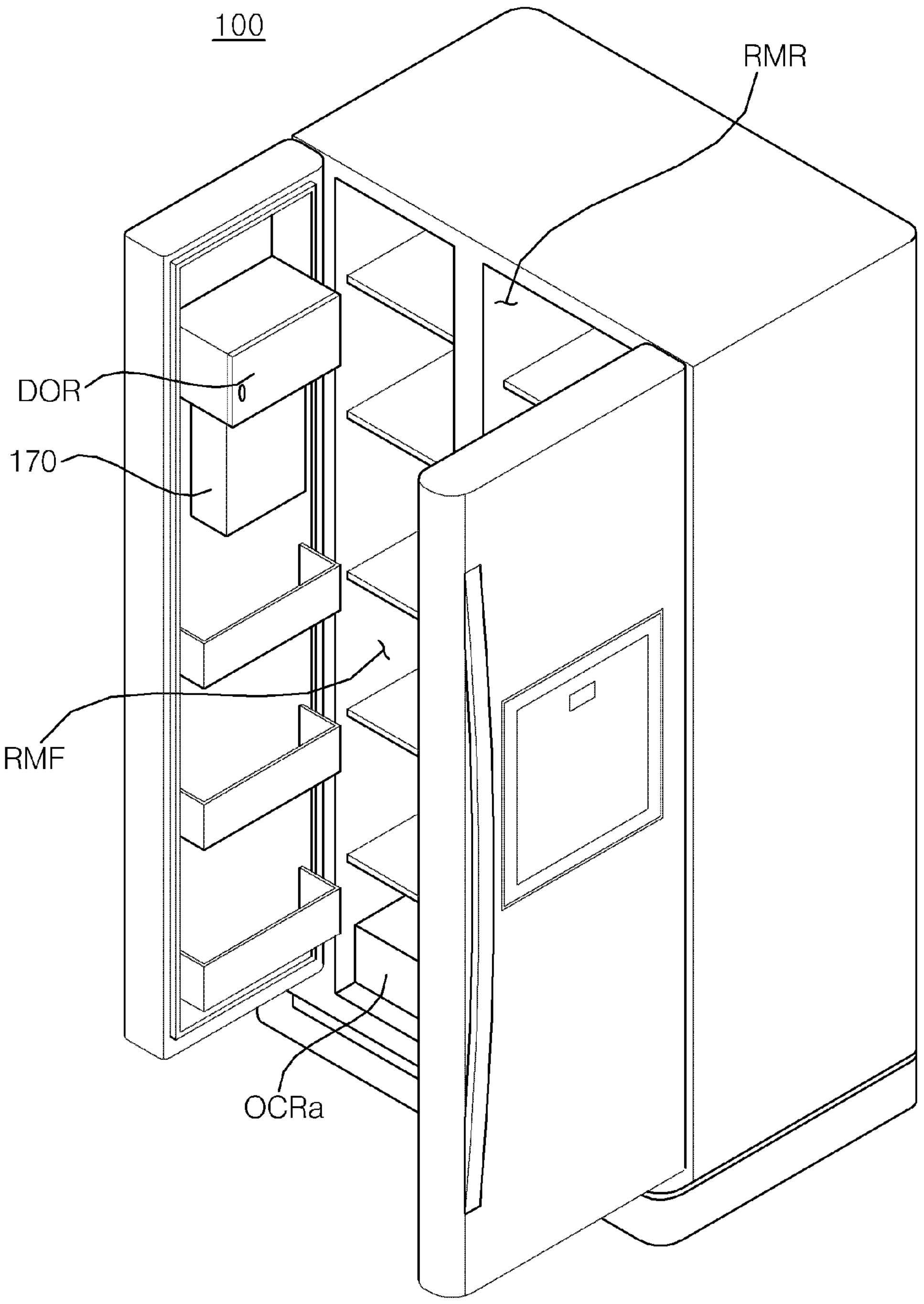
FIG. 2 is a perspective view of the refrigerator of FIG. 1 in which a door is opened.

FIG. 2 is a perspective view of the refrigerator of FIG. 1 in which the door is opened.

Referring to FIG. 2, the freezer compartment RMF is disposed inside the freezer compartment door 120 and the refrigerating compartment RMR is disposed inside the refrigerating compartment door 140.

The supercooling chamber OCRa may be placed at the lower portion of the freezer compartment RMF to maintain freshness without freezing goods by using the cold of the freezer compartment.

In the drawing, it is exemplified that the supercooling chamber OCRa is disposed at the lower space of the freezer compartment RMF. However, the present disclosure is not limited thereto, and the supercooling chamber may be disposed in various positions.

Figure 3:
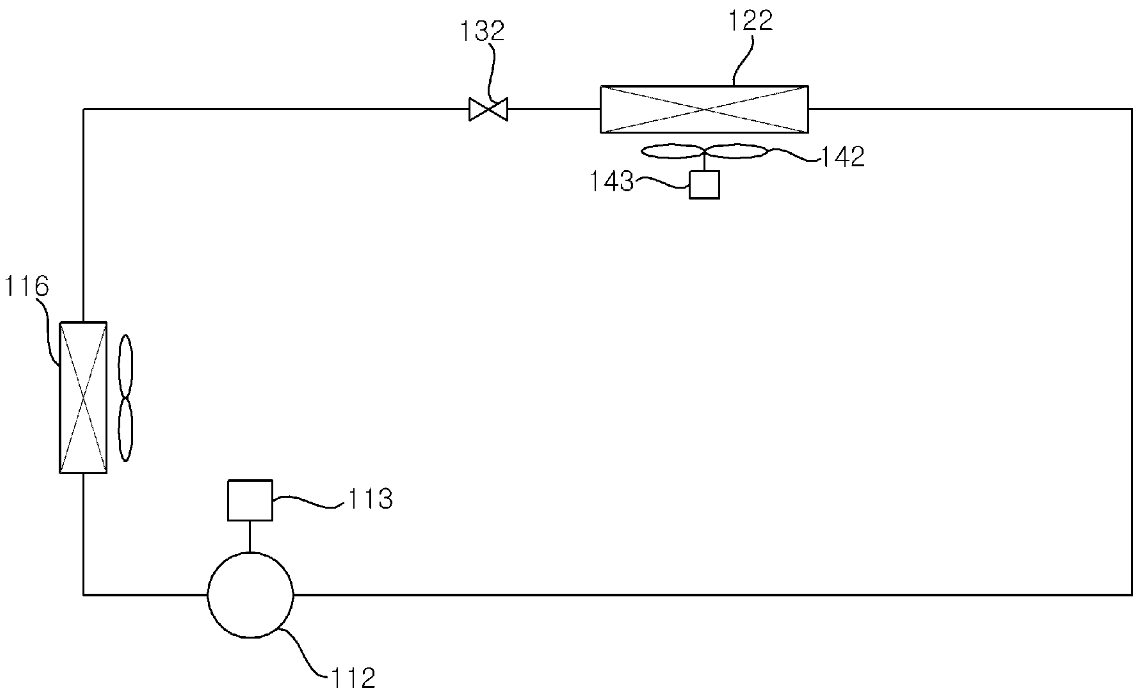
FIG. 3 is a schematic diagram illustrating a configuration of the refrigerator of FIG. 1.

FIG. 3 is a schematic diagram illustrating a configuration of the refrigerator of FIG. 1.

Referring to FIG. 3, the refrigerator 100 may include a compressor 112, a condenser 116 for condensing a refrigerant compressed by the compressor 112, a freezer compartment evaporator 122 which is supplied with the refrigerant condensed in the condenser 116 to be evaporated, and is disposed in the freezer compartment RMF, and a freezer compartment expansion valve 132 for expanding the refrigerant supplied to the freezer compartment evaporator 122.

Meanwhile, in the drawing, it illustrated that a single evaporator is used, but it is also possible to use multiple evaporators that may be used in the refrigerating compartment and the freezer compartment, respectively.

That is, the refrigerator 100 may further include a refrigerating compartment evaporator (not illustrated) disposed in the refrigerator compartment (not illustrated), a three-way valve (not illustrated) for supplying the refrigerant condensed in the condenser 116 to the refrigerating compartment evaporator (not illustrated) or the freezer compartment evaporator 122, and a refrigerating compartment expansion valve (not illustrated) for expanding the refrigerant supplied to the refrigerating compartment evaporator (not illustrated).

In addition, the refrigerator 100 may further include a gas-liquid separator (not illustrated) which separates the refrigerant passed through the evaporator 122 into a liquid and a gas.

In addition, the refrigerator 100 may further include a refrigerating compartment fan (not illustrated) and a freezer compartment fan 142 that sucks cold, for example cold air, that has passed through the freezer compartment evaporator 122 and blow the sucked cold into the refrigerating compartment (not illustrated) and the freezer compartment RMF respectively.

In addition, the refrigerator 100 may further include a compressor driver 113 for driving the compressor 112, and a refrigerating compartment fan driver (not illustrated) and a freezer compartment fan driver 143 for driving the refrigerating compartment fan (not illustrated) and the freezer compartment fan 142.

Meanwhile, based on the drawing, since a common evaporator 122 is used for the refrigerating compartment and the freezer compartment, in this case, a damper (not illustrated) may be installed between the refrigerating compartment and the freezer compartment, and a fan (not illustrated) may forcibly blow the cold generated in the one evaporator 122 to be supplied to the freezer compartment and the refrigerating compartment.

Figure 4A:
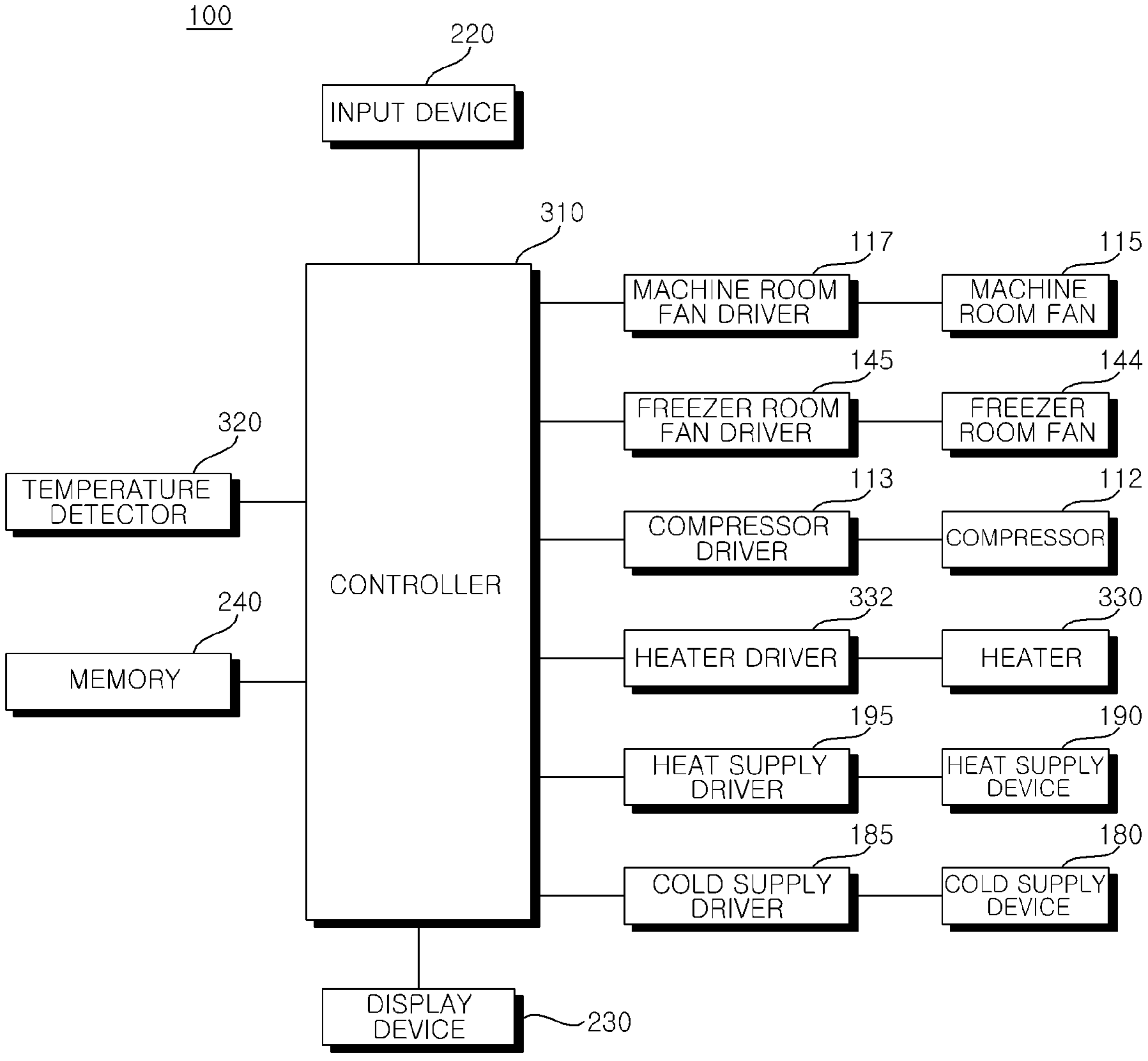
FIG. 4A is an exemplary schematic diagram illustrating components of the refrigerator illustrated in FIG. 1.

FIG. 4A is an exemplary schematic diagram illustrating components of the refrigerator illustrated in FIG. 1.

Referring to FIG. 4A, the refrigerator 100 includes the compressor 112, a machine room fan 115, the freezer compartment fan 144, a controller 310, a heater 330, a heat supply device 190, a temperature detector 320, and a memory 240.

In addition, the refrigerator may further include the compressor driver 113, a machine room fan driver 117, the freezer compartment fan driver 145, a heater driver 332, a cold supply driver 185, a cold supply device 180, a heat supply driver 195, the display device 230, and the input device 220.

The compressor 112, the machine room fan 115, and the freezer compartment fan 144 are described with reference to FIG. 2.

The input device 220 includes a plurality of operation buttons, and may transmit a signal corresponding to an input freezer compartment set temperature or refrigerating compartment set temperature to the controller 310.

The display device 230 may display an operation state of the refrigerator. Meanwhile, the display device 230 is operable under the control of a display controller (not illustrated).

The memory 240 may store data necessary for operating the refrigerator.

For example, the memory 240 may store power consumption information for each of the plurality of power consumption devices. In addition, the memory 240 may output corresponding power consumption information to the controller 310 based on the operation of each power consumption device in the refrigerator.

The temperature detector 320 may detect a temperature in the refrigerator and transmit a signal corresponding to the detected temperature to the controller 310. Here, the temperature detector 320 may detect the refrigerating compartment temperature and the freezer compartment temperature respectively. In addition, the temperature of each chamber in the refrigerating compartment or each chamber in the freezer compartment may be detected.

Meanwhile, the temperature detector 320 may detect the temperature in the supercooling chamber OCR. Specifically, an inlet temperature detector Tsi for detecting an inlet temperature of a cavity CAV in the supercooling chamber OCR and an outlet temperature detector Tso for detecting the outlet temperature of the cavity CAV may be provided.

As illustrated in the drawing, the controller 310 may control the compressor driver 113, the fan driver 117 or 145, the cold supply driver 185, and the heat supply driver 195 to control on/off operations of the compressor 112, the fan 115 or 144, the cold supply device 180, and the heat supply device 190, and may finally control the compressor 112, the fan 115 or 144, the cold supply device 180, and the heat supply device 190. Here, the fan driver may be the machine room fan driver 117 or the freezer compartment fan driver 145.

For example, the controller may be a microprocessor or a logical electrical circuit. The controller 310 may output a corresponding speed command value signal to the compressor driver 113 or the fan driver 117 or 145 respectively.

The compressor driver 113 and the freezer compartment fan driver 145 described above are provided with a compressor motor (not illustrated) and a freezer compartment fan motor (not illustrated) respectively, and each motor (not illustrated) may be operated at a target rotational speed under the control of the controller 310.

Meanwhile, the machine room fan driver 117 includes a machine room fan motor (not illustrated), and the machine room fan motor (not illustrated) may be operated at the target rotational speed under the control of the controller 310.

When the motor is a three-phase motor, it may be controlled by a switching operation in an inverter (not illustrated) or may be controlled at a constant speed by using an AC power source. Here, each motor (not illustrated) may be any one of an induction motor, a Blush less DC (BLDC) motor, a synchronous reluctance motor (synRM) motor, and the like.

Meanwhile, as described above, the controller 310 may control the overall operation of the refrigerator 100, in addition to the operation control of the compressor 112 and the fan 115 or 144.

For example, as described above, the controller 310 may control the overall operation of the refrigerant cycle based on the set temperature from the input device 220. For example, the controller 310 may further control a three-way valve (not illustrated), a refrigerating compartment expansion valve (not illustrated), and the freezer compartment expansion valve 132, in addition to the compressor driver 113, the refrigerating compartment fan driver (not illustrated), and the freezer compartment fan driver 145. In addition, the operation of the condenser 116 may also be controlled. In addition, the controller 310 may control the operation of the display device 230.

Meanwhile, the heater 330 may be a freezer compartment defrost heater. The freezer compartment defrost heater 330 may operate in order to remove frost attached to the freezer compartment evaporator 122. To this end, the heater driver 332 may control the operation of the heater 330. Meanwhile, the controller 310 may control the heater driver 332.

The controller 310 may output respective driving signals to the cold supply driver 185 and the heat supply driver 195 to control the cold supply device 180 and the heat supply device 190.

Accordingly, the cold supply device 180 or the heat supply device 190 operates, and cold, for example cold air, or heat, for example heated air, may be supplied into the supercooling chamber OCR.

In particular, based on the operation of the cold supply device 180 or the heat supply device 190, it is possible to maintain the supercooling state for freshness of goods in the supercooling chamber OCR.

Figure 4B:
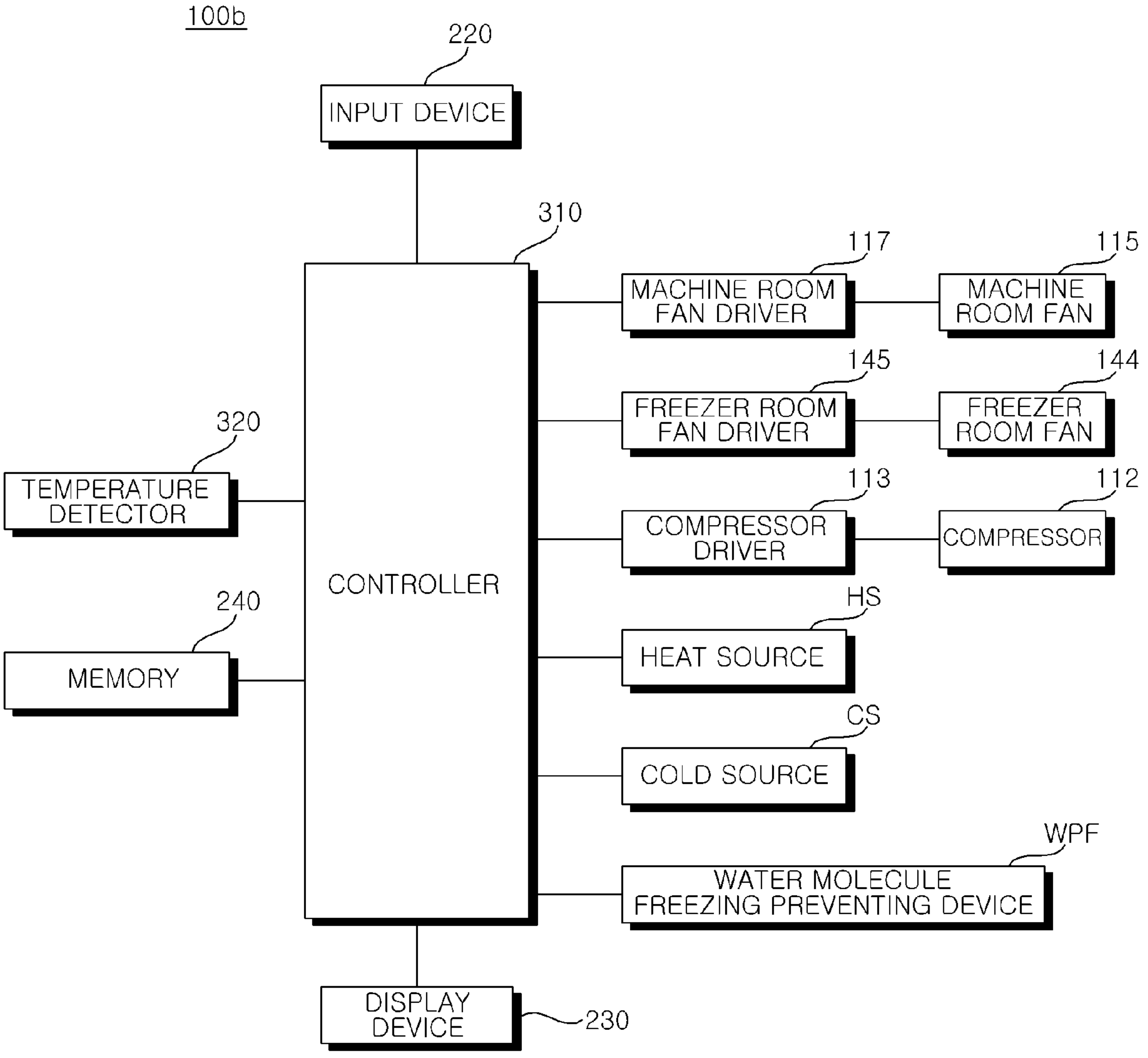
FIG. 4B is another exemplary schematic diagram illustrating components of the refrigerator illustrated in FIG. 1.

FIG. 4B is another exemplary schematic diagram illustrating components of the refrigerator illustrated in FIG. 1.

Referring to FIG. 4B, similarly to FIG. 4A, the refrigerator 100*b* of FIG. 4B includes the compressor 112, the machine room fan 115, the freezer compartment fan 144, the controller 310, the temperature detector 320, and the memory 240.

However, unlike FIG. 4A, the refrigerator 100*b* of FIG. 4B has a difference in that it includes a heat source HS, a cold source CS, and a water molecule freezing preventing device WPF.

The heat source HS may include at least one of a heater (330 in FIG. 4A) or an RF output device 190*a* (to be described below).

Meanwhile, the heat source HS may include the heat supply device 190 of FIG. 4A.

The cold source CS may include an evaporator 122 that performs heat exchange using the refrigerant compressed in the compressor 112.

Alternatively, the cold source CS may include a fan operated to supply cold generated by heat exchange at the evaporator 122 to a first storage compartment OCR.

Alternatively, the cold source (CS) may include a heat absorption surface of a thermoelectric element.

Alternatively, the cold source (CS) may further include a fan (FAa in FIG. 15) that operates to supply cold generated by heat exchange on the heat absorption surface of the thermoelectric element to the cavity CAV.

Alternatively, the cold source (CS) may include the cold supply device 180 of FIG. 4A.

The water molecule freezing preventing device WPF may include at least one of an RF output device, an electric field output device, a magnetic field output device, or an ultrasonic output device, and the like.

Figure 5A:
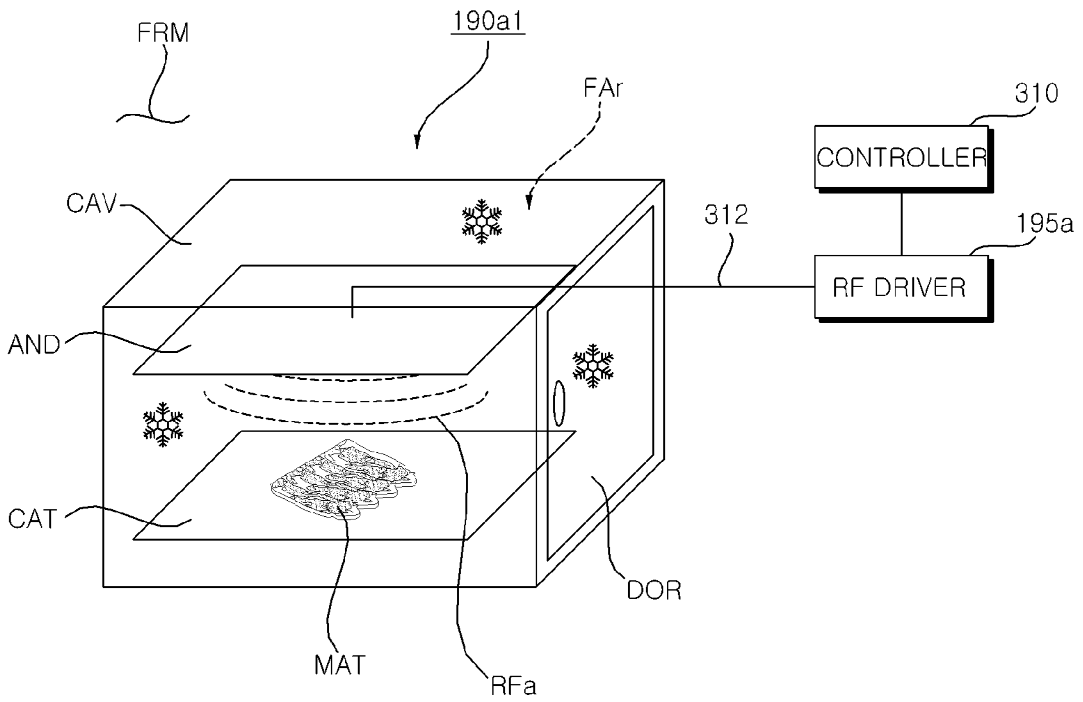
FIG. 5A is a diagram illustrating an exemplary radio frequency (RF) output device, which may be an example of a heat supply device of FIG. 4A.

FIG. 5A is a diagram illustrating an exemplary radio frequency (RF) output device, which may be an example of the heat supply device of FIG. 4A.

Referring to FIG. 5A, the RF output device 190*a*1 may include a first plate AND and a second plate CAT disposed inside or outside the cavity CAV.

The first plate AND and the second plate CAT may be spaced apart from each other, and may be disposed above and below the cavity CAV respectively, and the first plate AND may be electrically connected to an RF transmitter 312.

Meanwhile, when an electrical signal is applied to at least one of the first plate AND or the second plate CAT while the goods MAT is positioned on the second plate CAT or in the cavity CAV, the RF RFa may be output to the goods MAT inside the cavity CAV.

Meanwhile, unlike the drawing, the first plate AND and the second plate CAT may be disposed to be spaced apart from each other at the side surfaces of the cavity CAV.

In addition, in the drawing, it is illustrated that the door DOR is disposed at the side surface of the cavity CAV. The door DOR may be opened or closed by rotating or by moving in one direction.

Meanwhile, it is preferable that the RF output from the RF output device 190*a*1 is performed while the door DOR is closed. To this end, the RF output device 190*a*1 may further include a door open/close detection sensor that detects whether the door DOR is opened or closed.

Meanwhile, the RF transmitter 312 may be connected to an RF driver 195*a*. The RF driver 195 may be controlled by the controller 310.

For the goods MAT in the cavity CAV, the controller may be configured to operate the RF output device 190*a*1 among the first section P1*aa* in which the temperature of the goods MAT sequentially decreases to a first temperature T1*aa* which is a supercooling set temperature, a second section P2*aaa* in which the temperature of the goods MAT increases from the first temperature T1*aa* to a second temperature T2*aa* which is a thawing completion temperature, and a third section P3*aa* in which the temperature of goods MAT increases from the second temperature T2*aa* to a third temperature T3*aa* which to be higher than the first temperature T1*aa*, in the second section P2*aaa*.

The first section P1*aa* may be referred to as a first supercooling section, the second section P2*aaa* may be referred to as a thawing section, and the third section P3*aa* may be referred to as a second supercooling section.

The controller 310 may be configured to operate the RF output device 190*a*1 in the first section P1*aa* or the third section P3*aa*, in addition to the second section P2*aaa*.

Accordingly, it may be possible to maintain the freshness of the goods MAT in the refrigerator 100 using RF output. In particular, the movement of water molecules in the goods MAT by the RF output becomes active, and the freshness may be maintained while preventing the goods MAT from freezing.

Meanwhile, as the power of the RF output from the RF output device 190*a*1 increases, the controller 310 may control to increase the duration of the first section P1*aa*, or to delay the start point of the second section P2*aa* or increase the duration of the second section P2*aa*. Accordingly, the freshness of the goods MAT in the refrigerator 100 may be maintained by using the RF output.

Meanwhile, the controller 310 may output an RF to the goods MAT in the cavity CAV, and may be configured to further perform a third section P3*aa* in which the temperature of the goods MAT falls after the second section P2*aa*. Accordingly, the goods MAT may be frozen while maintaining the freshness of the goods MAT.

Meanwhile, in the operation of the RF output device 190*a*1, the cold FAr in the cooling chamber FRM may be supplied into the cavity CAV. Accordingly, the supercooling state of the goods MAT may be maintained while maintaining the freshness of the goods MAT in the refrigerator 100 by using the RF output.

Meanwhile, when the operation of the RF output device 190*a*1 is turned off, the cold FAr in the cooling chamber FRM is supplied into the cavity CAV, and when the RF output device 190*a*1 is operated, the cold FAr in the cooling chamber FRM may be supplied into the cavity CAV. Accordingly, it may be possible to freeze the goods MAT without supplying the RF output.

Meanwhile, when the RF output device 190*a*1 is operated, the power consumed in the compressor 112 may increase than before the RF output device 190*a*1 is operated. Accordingly, the supercooling state of the goods MAT may be maintained while maintaining the freshness of the goods MAT in the refrigerator 100 by using the RF output.

Meanwhile, when the RF output device 190*a*1 is operated, the temperature of the cooling chamber FRM may increase than before the RF output device 190*a*1 is operated. Accordingly, the supercooling state of the goods MAT may be maintained while maintaining the freshness of the goods MAT in the refrigerator 100 by using the RF output.

Meanwhile, heat insulating material may be attached to at least a portion of the inner surface or the outer surface of the cavity CAV. Accordingly, the inside of the cavity CAV is insulated from the cooling chamber FRM, so that the freshness of the goods MAT in the refrigerator 100 may be maintained by using the RF output into the cavity CAV.

Meanwhile, when the operation signal for the operation of the RF output device 190*a*1 is input in a state where the goods MAT is positioned in the cavity CAV, the RF output device 190*a*1 may output the RF in the direction of the goods MAT. Accordingly, the freshness of the goods MAT in the refrigerator 100 may be maintained by using the RF output.

Meanwhile, the controller 310 may control at least one of an output period or an output power of the RF to vary, based on the type of the goods MAT or the input signal. Accordingly, the freshness of the goods MAT may be appropriately maintained based on the type of the goods MAT.

Meanwhile, when the goods MAT is positioned in the cavity CAV, the temperature of the goods MAT falls based on the cold FAr supplied into the cooling chamber FRM, and then is maintained within a predetermined temperature range based on the RF output from the RF output device 190*a*1. Accordingly, the supercooling state of the goods MAT may be maintained while maintaining the freshness of the goods MAT in the refrigerator 100 by using the RF output.

Meanwhile, it is preferable that the temperature in the second section P2*aa* is higher than the lowest temperature at the time when the temperature of the goods MAT in the first section P1*aa* falls. Accordingly, the supercooling state of the goods MAT may be maintained while maintaining the freshness of the goods MAT in the refrigerator 100 by using the RF output.

Meanwhile, the controller 310 may control the RF output from the RF output device 190*a*1 before the time point of lowest temperature in the first section P1*aa*. Accordingly, the supercooling state of the goods MAT may be maintained while maintaining the freshness of the goods MAT in the refrigerator 100 by using the RF output.

Meanwhile, after the refrigerator 100 is turned on, the temperature of the cavity CAV may continue to fall until the temperature of the goods MAT maintains within a predetermined temperature range. Accordingly, the supercooling state of the goods MAT may be maintained while maintaining the freshness of the goods MAT in the refrigerator 100 by using the RF output.

Meanwhile, the falling slope or the lowest temperature at the time when the temperature of goods MAT in the first section P1*aa* falls may change based on the power of the RF output from the RF output device 190*a*1. Accordingly, the supercooling state of the goods MAT may be maintained while maintaining the freshness of the goods MAT in the refrigerator 100 by using the RF output.

Meanwhile, as the power of the RF output becomes larger, the magnitude of the MAT temperature fall slope becomes smaller, and the lowest temperature may become higher. Accordingly, the supercooling state of the goods MAT may be maintained while maintaining the freshness of the goods MAT in the refrigerator 100 by using the RF output.

Meanwhile, the controller 310 may control the RF output from the RF output device 190*a*1, from the time when the temperature of the goods MAT falls. Accordingly, the supercooling state of the goods MAT may be maintained while maintaining the freshness of the goods MAT in the refrigerator 100 by using the RF output.

Meanwhile, when the maintaining period within a predetermined temperature range of the goods MAT is greater than or equal to an allowable period, the controller 310 turns off the RF output device 190*a*1, and may control the cold FAr supplied to the cooling chamber FRM in the cavity CAV. Accordingly, the supercooling state of the goods MAT may be maintained while maintaining the freshness of the goods MAT in the refrigerator 100 by using the RF output.

Meanwhile, the controller 310 is configured to output the RF to the cavity CAV when there is an operation input signal for the RF output device 190*a*1 while the goods MAT is frozen. It is preferable that the power of the RF output at the time when freezing the goods MAT is greater than the power of the RF output before freezing the MAT. Accordingly, the supercooling state of the goods MAT may be maintained while maintaining the freshness of the goods MAT in the refrigerator 100 by using the RF output.

Meanwhile, the frequency of the RF output is preferably between 13.56 MHz to 433 MHz. Accordingly, the movement of water molecules in the goods MAT by the RF output becomes active, so that the goods MAT may be frozen while maintaining the freshness of the goods MAT.

Meanwhile, the controller 310 controls the RF of a first power to be output during a scan section, determines the type of the goods MAT based on the RF output reflected during the scan section and, after the end of the scan section, may control the RF of the second power set based on the determined type of the goods MAT. Accordingly, the supercooling state of the goods MAT may be maintained while efficiently maintaining the freshness of the goods MAT in the refrigerator by using the RF output.

Meanwhile, among a cooling section, an idle section, a pre-defrost cooling section, a defrost section, a post-defrost idle section, a post-defrost cooling section, the controller 310 may control the output of the RF in the cooling section, the pre-defrost cooling section, or the post-defrost cooling section to be greater than the output in the idle section, the defrost section, or the post-defrost idle section. Accordingly, the supercooling state of the goods MAT may be maintained while maintaining the freshness of the goods MAT in the refrigerator 100 by using the RF output.

Meanwhile, the controller 310 may control the output of the RF to decrease or stop in the defrost section or during a door (DOR) load response operation, and control the output of the RF to increase after the defrost section or the end of the load response operation when the door (DOR) is opened. Accordingly, the supercooling state of the goods MAT may be maintained while maintaining the freshness of the goods MAT in the refrigerator 100 by using the RF output.

Meanwhile, when the defrost section is performed while the RF is output, the controller 310 may control the power of the RF to decrease, and control the power of the RF to increase when the defrost section is released. Accordingly, the supercooling state of the goods MAT may be maintained while maintaining the freshness of the goods MAT in the refrigerator 100 by using the RF output.

Meanwhile, when the door DOR of the cooling chamber FRM or the cavity CAV is opened, the controller 310 may control to stop the output of the RF in operation. Thus, power consumption may be reduced.

Meanwhile, when a temperature of the cooling chamber FRM is equal to or lower than a first temperature, and the temperature in the cavity CAV is equal to or lower than a second temperature higher than first temperature in the state where the cooling chamber FRM or the door DOR of the cavity CAV is closed, the controller 310 may control to output the RF. Accordingly, the supercooling state of the goods MAT may be maintained while maintaining the freshness of the goods MAT in the refrigerator 100 by using the RF output.

Meanwhile, the controller 310 determines the state of the goods MAT in the cavity CAV while the RF is output, and may change the power of the RF, continuously output the RF, or stop the RF output based on the state of the goods MAT. Accordingly, the supercooling state of the goods MAT may be maintained while maintaining the freshness of the goods MAT in the refrigerator 100 by using the RF output.

Meanwhile, the controller 310 may control to stop the output of the RF, when the temperature of the cooling chamber FRM is greater than the first temperature or when the temperature in the cavity CAV is greater than the second temperature. Accordingly, the supercooling state of the goods MAT may be maintained while maintaining the freshness of the goods MAT in the refrigerator 100 by using the RF output.

Meanwhile, the RF output device 1901*a* includes the first plate AND and the second plate CAT, and the RF output device 190*a*1 may further include at least one of a signal detector for detecting the RF output reflected from the goods MAT in the cavity CAV, a temperature detector for detecting the temperature in the cavity CAV, or a camera for photographing the goods MAT in the cavity CAV. Accordingly, through a feedback of the RF output, the supercooling state of the goods MAT may be maintained while efficiently maintaining the freshness of the goods MAT in the refrigerator 100.

Meanwhile, the RF output device 190*a*1 of FIG. 5A may be disposed in the cooling chamber FRM, may be disposed inside or outside the cavity CAV, and may output the RF into the cavity CAV.

Figure 5B:
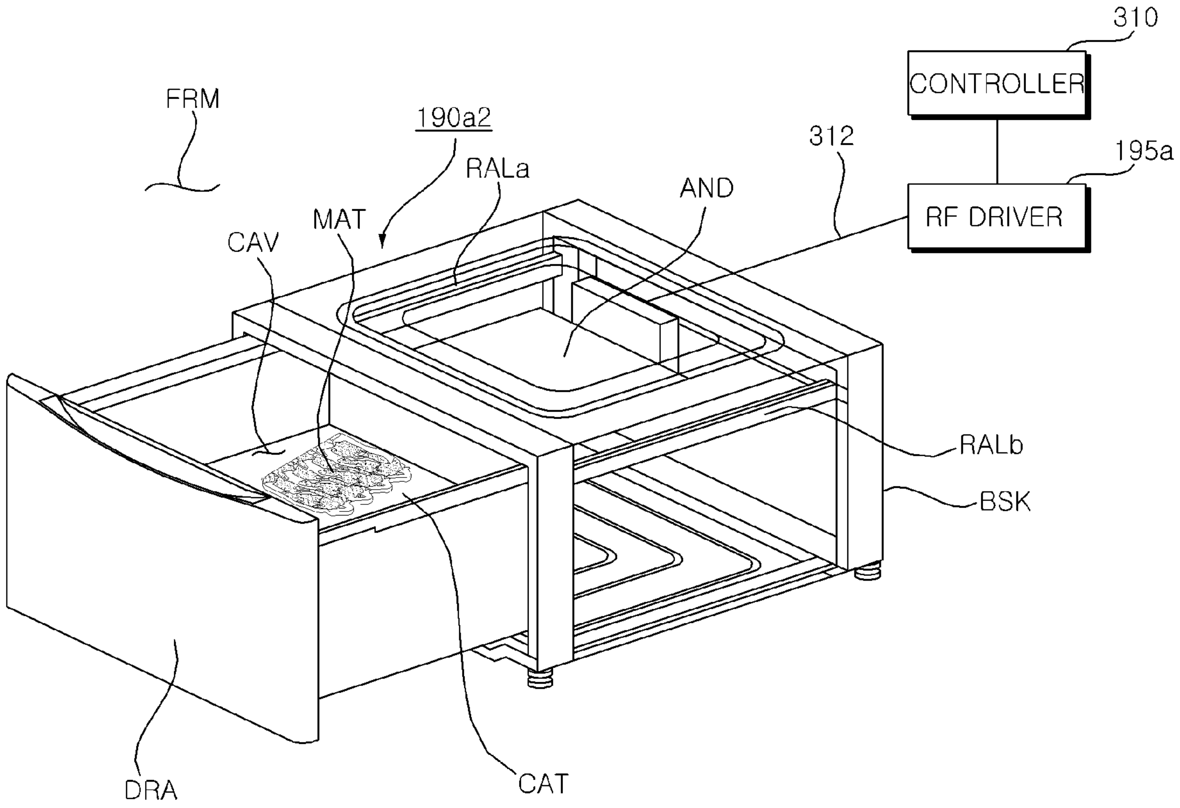
FIG. 5B is a diagram illustrating another exemplary RF output device, which may be an example of the heat supply device of FIG. 4A.

FIG. 5B is a diagram illustrating another exemplary RF output device which is an example of the heat supply device of FIG. 4A.

Referring to FIG. 5B, the RF output device 190*a*2 according to another embodiment of the present disclosure may include the cavity CAV disposed in the cooling chamber FRM.

The RF output device 190*a*2 according to another embodiment of the present disclosure is similar to the RF output device 190*a* of FIG. 5A, but there is a difference in that the cavity CAV is formed with a drawer DRA and a basket BSK.

A rail member (RALa, RAlb) for coupling with the drawer DRA is disposed in the basket BSK, and the drawer DRA may be moved back and forth through the coupling of the rail member (RALa, RAlb). Accordingly, the door DOR as illustrated in FIG. 5A is omitted.

Meanwhile, the RF output device 190*a*2 may include the first plate AND and the second plate CAT that are disposed inside the cavity CAV or are disposed outside the cavity CAV.

In particular, in the drawing, it is illustrated that the first plate AND is disposed at the top of the basket BSK, and the second plate CAT is disposed at the bottom of the drawer DRA.

Meanwhile, the goods MAT is disposed at the bottom of the drawer DRA or on the second plate CAT.

Meanwhile, the first plate AND may be electrically connected to the RF transmitter 312.

Meanwhile, in a state where the goods MAT is disposed on the second plate CAT or in the cavity CAV, when an electrical signal is applied to at least one of the first plate AND or the second plate CAT, the RF signal RFa may be output to the goods MAT inside the cavity CAV.

Meanwhile, it is preferable that the RF from the RF output device 190*a*2 is output in a state the drawer DRA is coupled to the basket BSK and is closed. To this end, the RF output device 190*a*2 may further include a drawer DRA coupling detection sensor for detecting whether the drawer DRA is coupled and closed.

Meanwhile, the RF transmitter 312 may be connected to the RF driver 195*a*, and the RF driver 195*a* may be controlled by the controller 310.

The RF output device 190*a*2 of FIG. 5B may be disposed in the cooling chamber FRM, may be disposed inside or outside the cavity CAV, and may output the RF into the cavity CAV.

Figure 6:
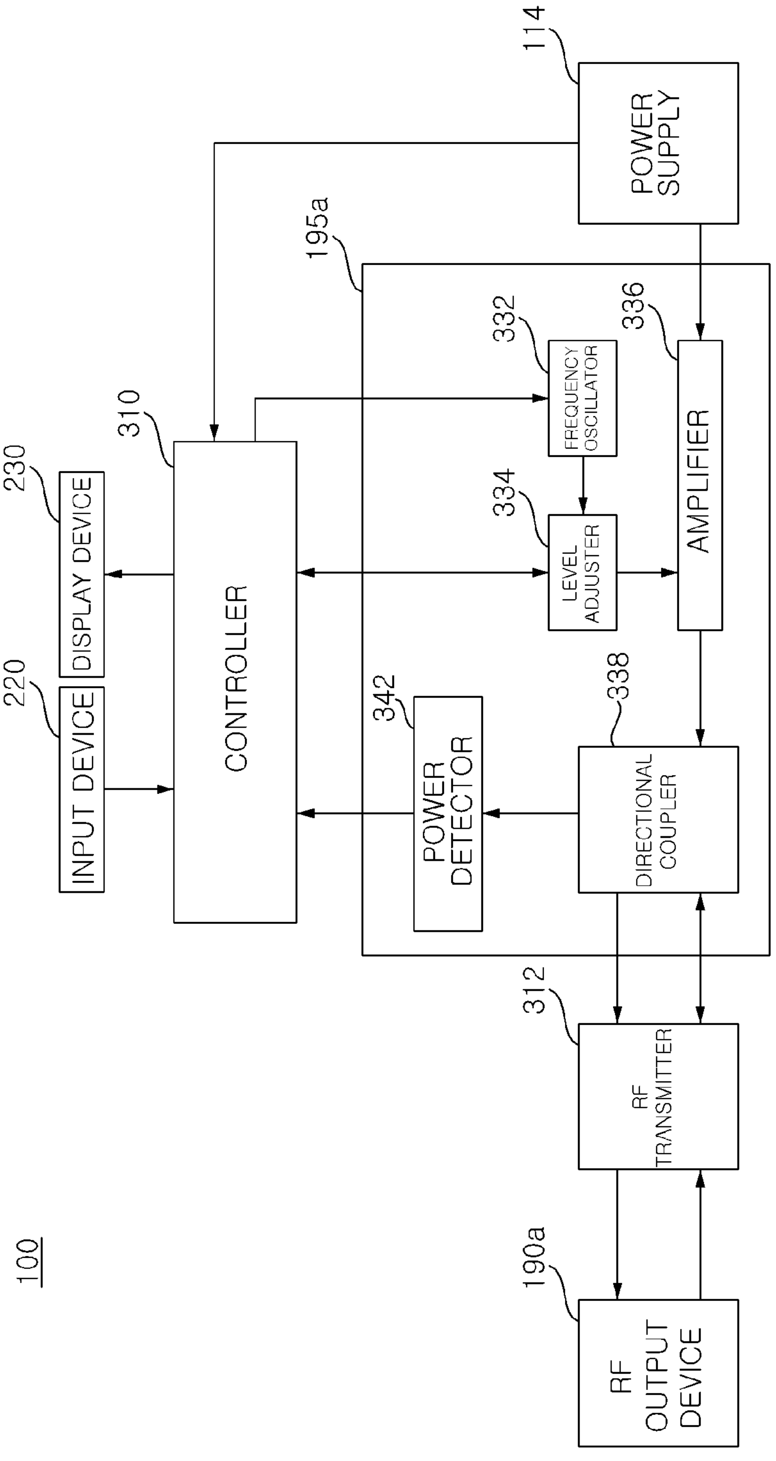
FIG. 6 is a schematic diagram illustrating components of an RF driver, which may be an example of the heat supply driver of FIG. 4A.
Figure 7A:
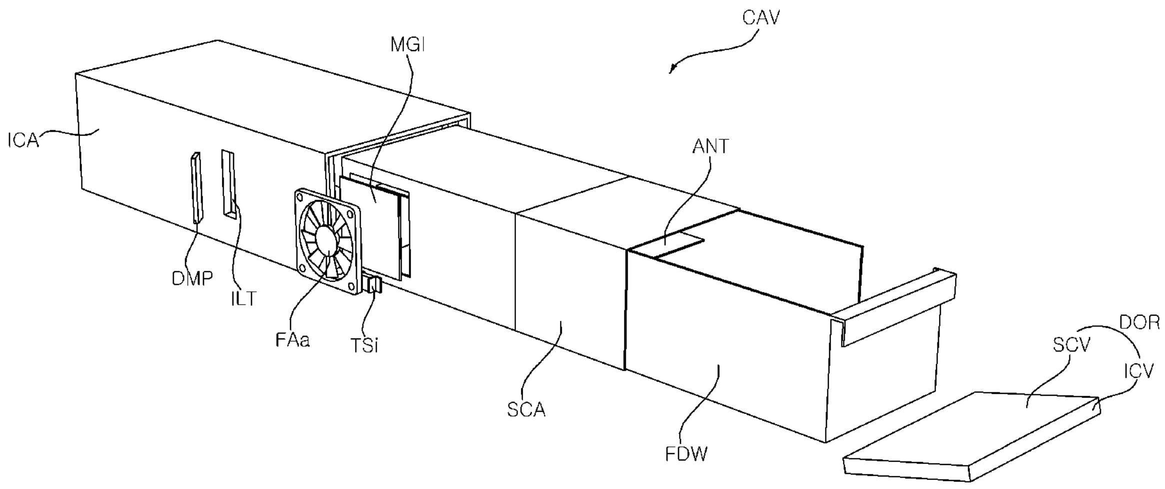
FIGS. 7A to 7D are views illustrating cavities in a supercooling chamber according to an embodiment of the present disclosure.
Figure 7B:
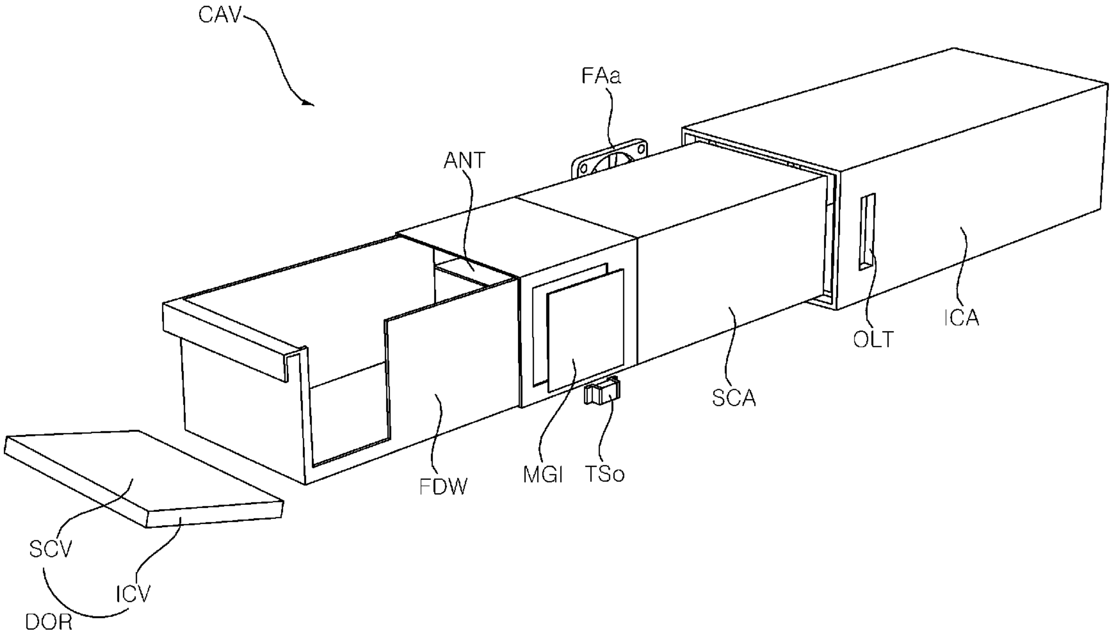
Figure 7C:
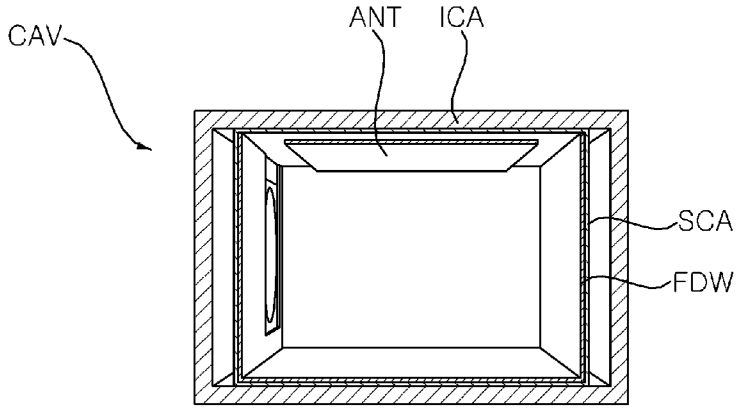
Figure 7C:
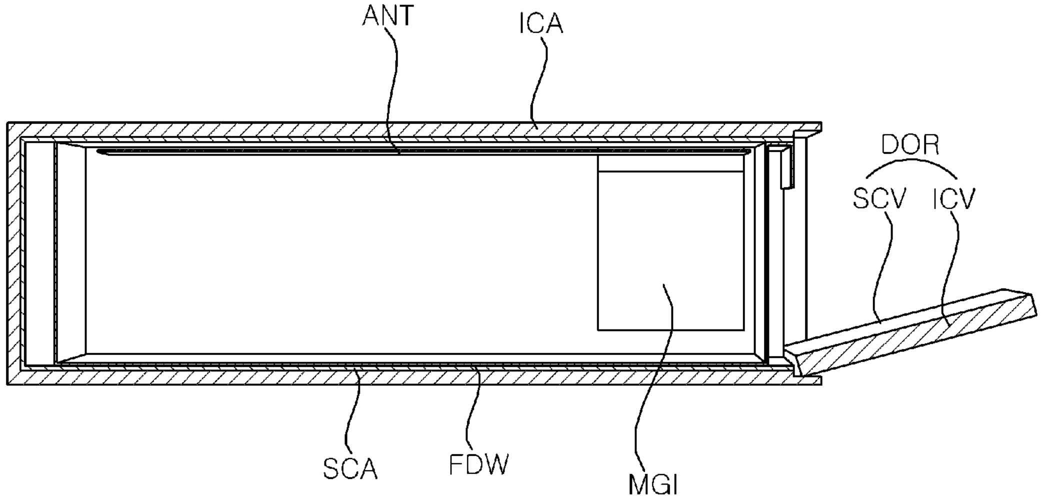
Figure 7D:
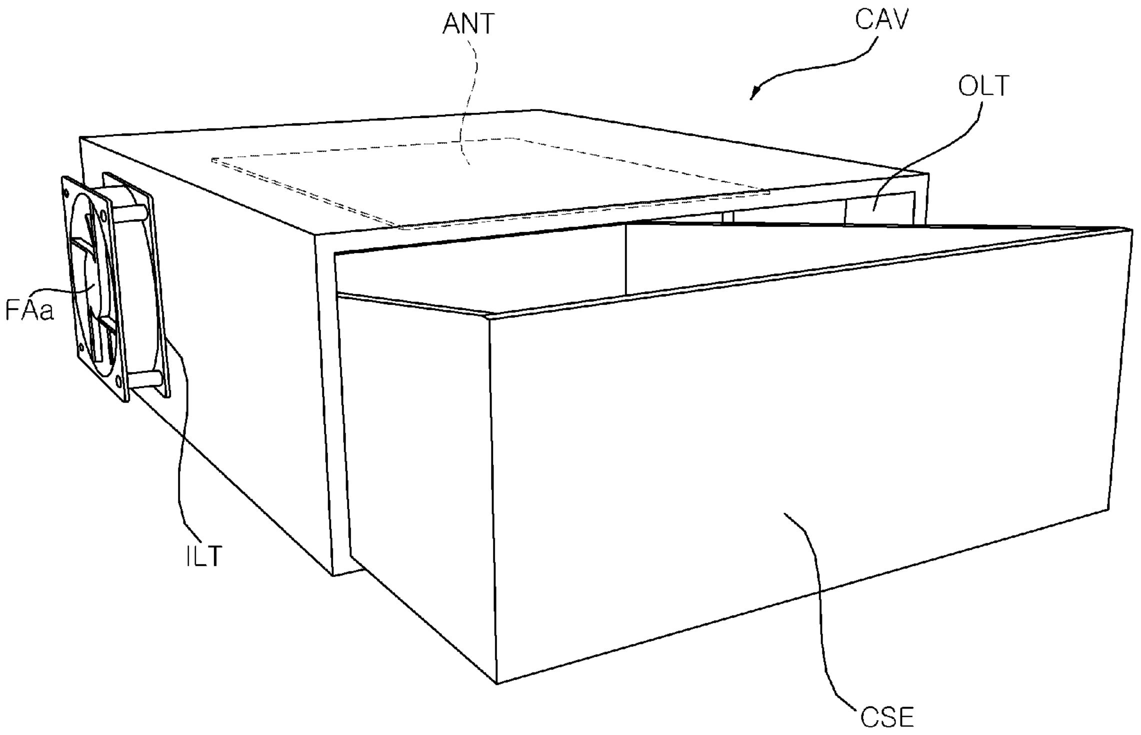

FIG. 6 is a schematic diagram illustrating components of the RF driver which is an example of the heat supply driver of FIG. 4A.

Referring to FIG. 6, the RF output device 190*a* may be connected to the RF transmitter 312, and the RF transmitter 312 may be connected to the RF driver 195*a*.

The input device 220 may include a separate button for switching on or off the RF output device 190*a*.

The display device 230 may display information related to the switching on or off of the RF output device 190*a*.

The controller 310 may control the RF output device 190*a* by using the RF driver 195*a*.

The RF driver 195*a* may include a frequency oscillator 332, a level adjuster 334, an amplifier 336, a directional coupler 338, and a power detector 342.

The frequency oscillator 332 oscillates to output the RF to a corresponding frequency, by a frequency control signal from the controller 310.

The frequency oscillator 322 may include a voltage controlled oscillator VCO. Based on the voltage level of the frequency control signal, the voltage controlled oscillator VCO oscillates at a corresponding frequency. For example, as the voltage level of the frequency control signal becomes higher, the frequency oscillated and generated by the voltage controlled oscillator VCO becomes higher.

The level adjuster 334 may oscillate the frequency signal oscillated by the frequency oscillator 332 to output the RF with a corresponding power based on the power control signal. The level adjuster 334 may include a voltage controlled attenuator VCA.

Based on the voltage level of the power control signal, the voltage controlled attenuator VCA performs a correction operation so that the RF is output with a corresponding power. For example, as the voltage level of the power control signal becomes higher, the power level of the signal output from the voltage controlled attenuator VCA becomes higher.

The amplifier 336 may output the RF by amplifying the oscillated frequency signal, based on the frequency signal oscillated by the frequency oscillator 332 and the power control signal by the level adjuster 334.

The amplifier 336 may include a solid state power amplifier SSPA using a semiconductor device, and in particular, may include a Monolithic Microwave Integrated Circuits MMIC using a single substrate. Thus, the size thereof is reduced, and the integration of device may be achieved.

Meanwhile, the frequency oscillator 332, the level adjuster 334, and the amplifier 336, described above, may be implemented as a single device, which may be referred to as a solid state power oscillator SSPO.

The directional coupler DC 338 transmits the RF amplified and output by the amplifier 336 to the RF transmitter 312. The RF output from the RF transmitter 312 is output to the goods in the RF output device 190*a*.

Meanwhile, the RF output that is not absorbed and reflected by the goods in the RF output device 190*a* may be input to the directional coupler 338 through the RF transmitter 312. The directional coupler 338 transfers the reflected RF to the controller 310.

Meanwhile, the power detector 342 is disposed between the directional coupler 338 and the controller 310, and detects the output power of the RF which is amplified and output by the amplifier 336 and transferred to the RF transmitter 312 via the directional coupler 338. The detected power signal is input to the controller 310, and is used for a power output efficiency calculation. Meanwhile, the power detector 342 may be implemented of a diode device, or the like to detect power.

Meanwhile, the RF driver 195*a* is disposed between the amplifier 336 and the directional coupler 338, and may further include an isolation device (not illustrated) for passing through the RF in the case of transferring the RF amplified by the amplifier 336 to the RF output device 190*a*, and blocking the RF reflected from the RF output device 190*a*. Here, the isolation device (not illustrated) may be implemented of an isolator.

The controller 310 may calculate RF output efficiency, based on the RF which is not absorbed and reflected by the goods among the RFs emitted by the RF output device 190*a*.

Meanwhile, when the plurality of RFs are sequentially emitted by the RF output device 190*a*, the controller 310 calculates RF output efficiency for each frequency of the plurality of RFs.

Meanwhile, the controller 310 may control an RF signal output section to be divided into a scan section and a main operation section so as to output RF efficiently.

The controller 310 may sequentially output a plurality of RFs through the RF output device 190*a* during the scan section, and calculate RF output efficiency based on the reflected RF.

In addition, the controller 310 may output RFs having different output periods respectively or output only the RF having a certain frequency, in the main operation section, based on the RF output efficiency calculated in the scan section. Meanwhile, it is preferable that the power of the RF in the main operation section is significantly higher than the power of the RF in the scan section. Thus, power consumption may be reduced.

The controller 310 may generate and output a frequency control signal to vary the output period of the RF based on the calculated RF output efficiency.

Meanwhile, the controller 310 may control to output the RF of a corresponding frequency, only when the RF output efficiency calculated for each frequency is equal to or greater than a set value.

The power supply 114 may boost the power input to the refrigerator to a high voltage and output to the RF driver 195*a*. The power supply 114 may be implemented of a high voltage transformer or an inverter.

FIGS. 7A to 7D are views illustrating cavities in a supercooling chamber according to an embodiment of the present disclosure.

Referring to the drawings, the cavity CAV in the supercooling chamber according to the embodiment of the present disclosure may include an outermost insulating case ICA, a damper DMP which is formed on one side surface of the insulating case ICA and disposed near the inlet ILT, a shield case SCA which is accommodated inside the insulation case ICA, a first mesh grid MGI which is disposed on one side surface of the shield case SCA, a fan FAa which is disposed on the mesh grid MGI, an inlet temperature detector Tsi which is disposed near the fan FAa, a second mesh grid MGI which is disposed on the other side surface of the shield case SCA, an outlet temperature detector Tso which is disposed near the second mesh grid MGI, a drawer FDW which contains the goods and can be withdrawn forward, and a door DOR which is attached to the front of the drawer FDW and rotatable.

The inlet ILT may be formed on one side surface of the insulating case ICA, the outlet OLT may be formed on the other side surface thereof, the inlet temperature detector Tsi may be disposed in a corresponding area near the inlet ILT of the insulating case ICA, and the outlet temperature detector Tso may be disposed in a corresponding region near the outlet OLT of the insulating case ICA.

Meanwhile, the door DOR may include an inner surface shield cover SCV and an outer surface insulation cover ICV to block heat.

Meanwhile, in order to output the RF into the drawer FDW, an antenna ABT may be disposed at an upper portion of an inner surface of the shield case SCA.

By the operation of the fan FAa, cold flows in through the inlet ILT formed on one side surface of the insulating case ICA and passes through the goods inside the drawer FDW, and a portion of heat-exchanged cold flows out through the outlet OLT formed on the other side surface of the insulating case ICA.

Figure 8A:
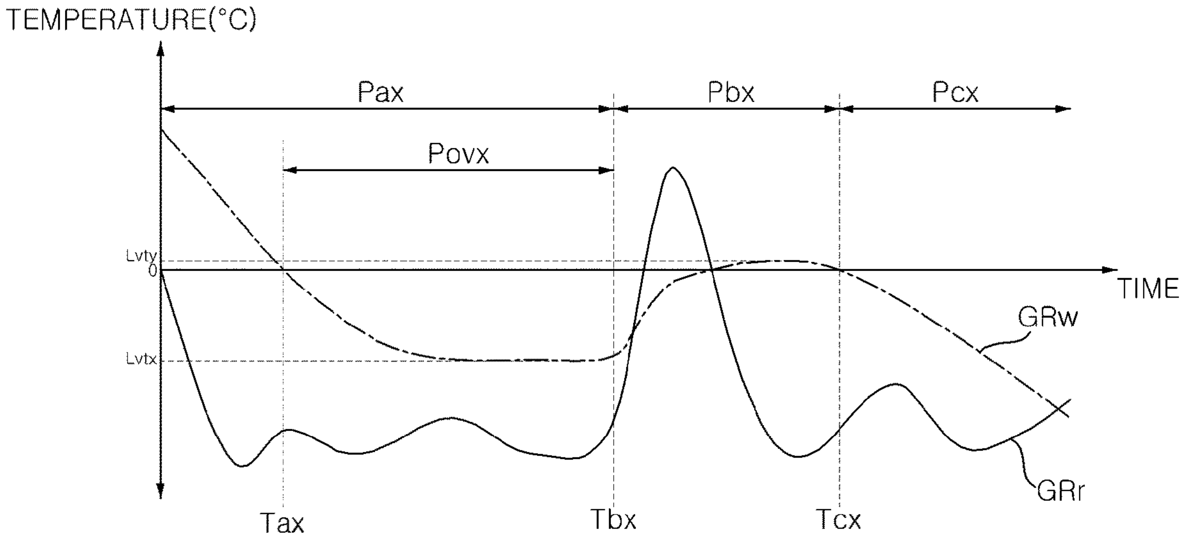
FIG. 8A is a graph illustrating a temperature change of water when an RF is not output.

FIG. 8A is a graph illustrating a temperature change of water when the RF is not output.

Referring to FIG. 8A, GRw according to cold supply represents a graph of temperature change of water, and GRr represents a graph of ambient temperature change.

In a Pax section, the temperature of the water gradually decreases, and then a Lvtx temperature may be maintained below a freezing temperature.

The Pax section may correspond to a liquid section in which a phase change from liquid to solid does not occur even though the temperature of water is below the freezing temperature.

In particular, a section Povx below 0° C. in the Pax sections may be referred to as a supercooling section.

In the Pax section, the temperature around the water is kept lower than the water temperature.

Next, a Pbx section after the Pax section is a section in which the phase changes from liquid to solid due to release of the supercooling, and may be a mixture section of liquid and solid.

In the Pbx section, the water temperature sequentially increases, resulting in a section where the ambient temperature increases more than the water temperature due to the phase change from liquid to solid.

In a Pcx section after the Pbx section, water changes to a solid, and thus, the Pcx section may correspond to a solid section.

Accordingly, in the Pbx section, the water temperature sequentially decreases, and the ambient temperature remains lower than the water temperature.

In order to maintain the freshness of the goods in the refrigerator, it may be better not to cause supercooling release. Therefore, it may be important for the supercooling section to prevent condensation from occurring during the Pax section through the internal motion of water molecules.

To this end, in the present disclosure, an RF may be output into a cavity CAV inside the supercooling chamber by using the RF output device 190*a*.

Figure 8B:
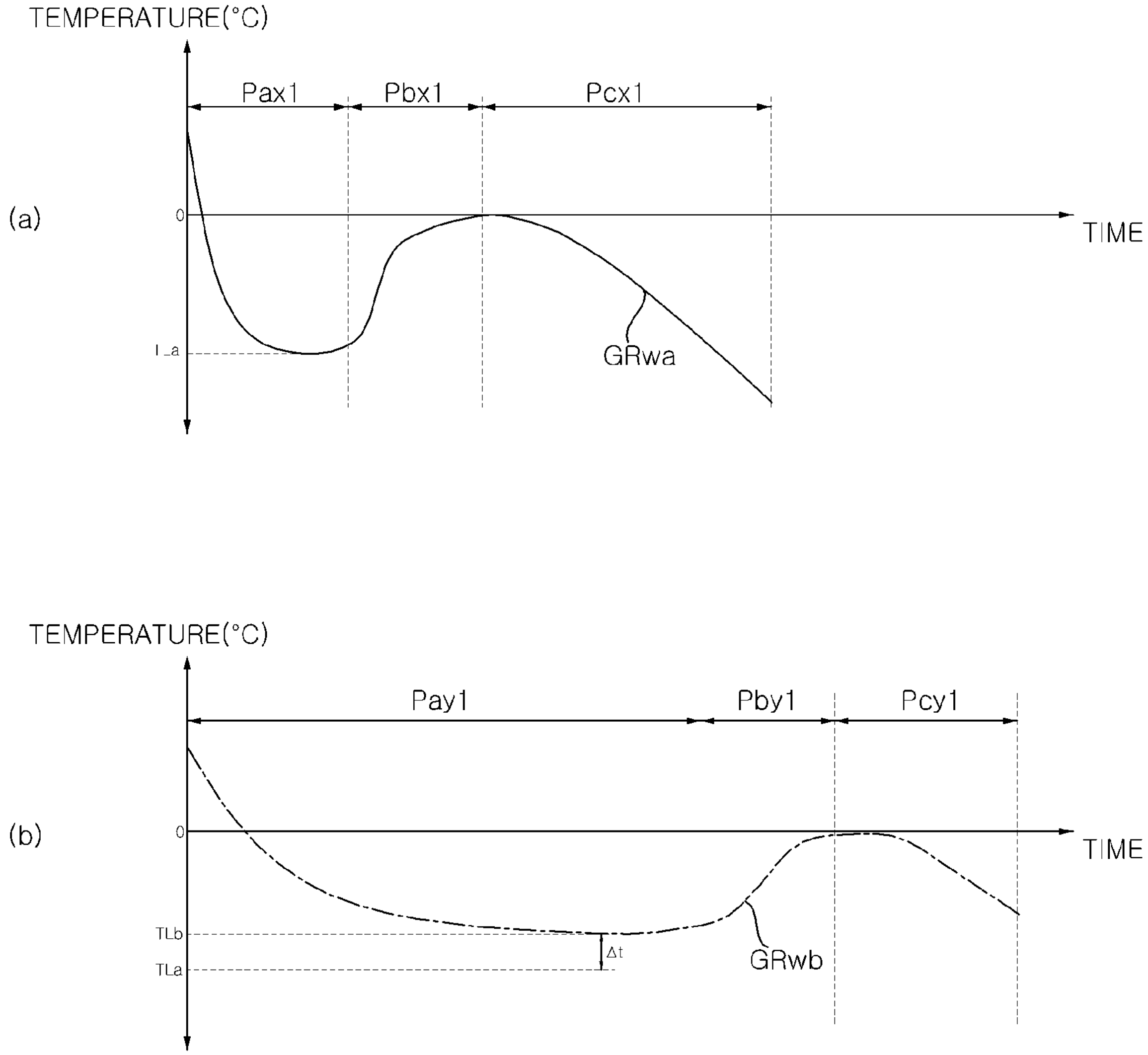
FIG. 8B is a graph illustrating a temperature change of water according to the presence or absence of the RF output.

FIG. 8B is a graph illustrating a temperature change of water according to the presence or absence of the RF output.

Referring to the drawing, (a) of FIG. 8B illustrates a water temperature change graph GRWa when an RF is not output.

In the water temperature change graph GRWa, a Pax1 section may be the supercooling section and a section in which water is in a liquid state, a Pbx1 section may be a section in which the phase changes from liquid to solid due to release of the supercooling and a mixed section of liquid and solid, and a Pcx1 section may correspond to a solid section in which water is changed into solid.

(b) of FIG. 8B illustrates a water temperature change graph GRWb when an RF is output.

In the water temperature change graph GRWb, a Pay1 section may be a supercooling section and a section in which water is in a liquid state, a Pby1 section is a section in which the phase changes from liquid to solid due to the release of the supercooling and a mixed section of liquid and solid, and a Pcy1 section may correspond to a solid section where water is changed into solid.

According to (b) of FIG. 8B, since the RF is output, according to the movement of water molecules, the supercooling state is maintained for a considerably longer time than in (a) of FIG. 8A.

In particular, although the release of the supercooling easily occurs due to external impact such as opening and closing of a door, according to (b) of FIG. 8B, the release of the supercooling does not occur due to the output of the RF, and the supercooling state may be maintained for a considerably longer period of time.

As a result, when the RF is output to goods in a liquid state, the freshness of goods may be maintained for a considerably longer time according to the movement of water molecules.

Meanwhile, in the present disclosure, regardless of the output of the RF, in a situation after the supercooling is released and the freezing of goods starts by the mixed section of liquid and solid, a method of entering a re-supercooling state is proposed to maintain the freshness of the goods. Particularly, a method that may efficiently use the power consumption of the refrigerator by efficiently supplying cold and heat during the re-supercooling is proposed.

Particularly, a method that may efficiently supply cold or heat until reaching the supercooling maintaining section is proposed. This will be described with reference to FIG. 9 below.

Figure 9:
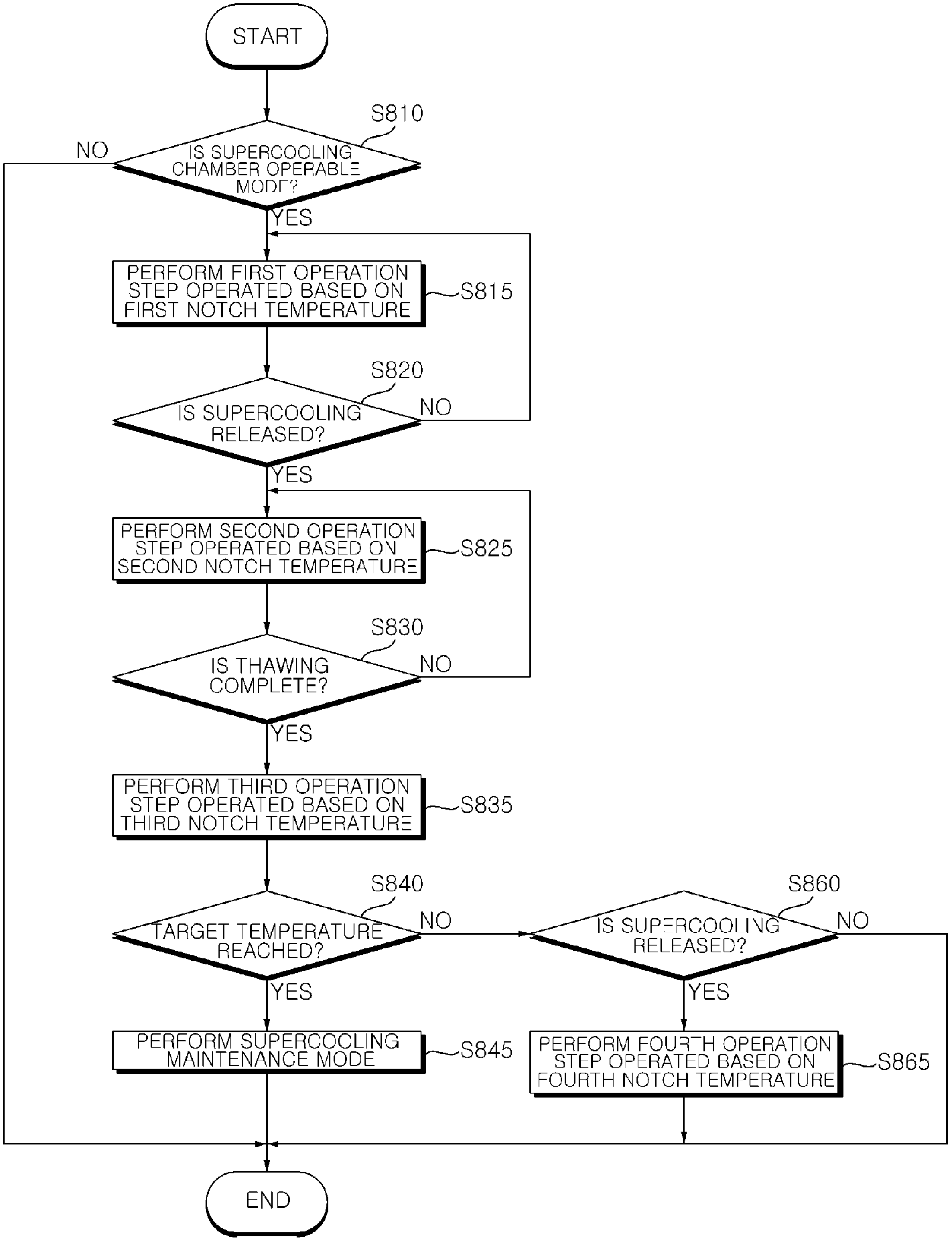
FIG. 9 is a flowchart illustrating a method of operating a refrigerator according to an embodiment of present disclosure.

FIG. 9 is a flowchart illustrating a method of operating a refrigerator according to an embodiment of present disclosure. For example, the flowchart may be a controller executing instructions stored in a semi-conductor memory, a storage media, and the like.

Referring to FIG. 9, the controller 310 determines whether the supercooling chamber OCRa and/or OCRb is in an operable mode (S810). A supercooling chamber will be referred to as a first storage compartment OCR.

For example, when an operation button associated with the first storage compartment OCR is turned on, the controller 310 may be configured to operate the first storage compartment OCR.

As another example, when the operation button associated with the first storage compartment OCR is turned off, the controller 310 may be configured not to operate the first storage compartment OCR.

Meanwhile, before Step 810 (S810), the operation mode of the first storage compartment OCR may be varied. The operation mode may include at least one of a refrigerating operation mode, a supercooling operation mode, or a thawing mode.

For example, before Step 810 (S810), the first storage compartment OCR may operate in the refrigerating operation mode, and after Step 810 (S810), the first storage compartment OCR may operate in the supercooling operation mode.

Meanwhile, a notch temperature of the first storage compartment OCR in the refrigerating operation mode may be higher than a notch temperature of the first storage compartment OCR in the supercooling operation mode. Accordingly, the temperature of the first storage compartment OCR may decrease more in the supercooling operation mode than in the refrigerating operation mode.

Meanwhile, the notch temperature may mean a set temperature.

For example, a notch temperature of the refrigerating compartment may be 3° C., and a notch temperature of the freezer compartment may be −18° C. Meanwhile, a notch temperature of the first storage compartment OCR or the supercooling chamber may be between 0° C. and −10° C.

Meanwhile, the notch temperature of the first storage compartment OCR in the refrigerating operation mode may be lower than the notch temperature of the first storage compartment OCR in the heating operation mode. Accordingly, the temperature of the first storage compartment OCR may increase more in the heating operation mode than in the refrigerating operation mode.

Meanwhile, the refrigerator may further include a second storage compartment RMR disposed outside the first storage compartment OCR. The second storage compartment RMR may correspond to the refrigerating compartment RMR of FIG. 1.

Accordingly, the controller 310 may be configured to control the notch temperature of the second storage compartment RMR to be higher than the notch temperature for the cooling operation of the first storage compartment OCR. Accordingly, the temperature of the second storage compartment RMR is higher than that of the first storage compartment OCR.

Meanwhile, the refrigerator may further include a third storage compartment RMF. The third storage compartment RMF may correspond to the freezer compartment RMF of FIG. 1.

Accordingly, the controller 310 may be configured to control the notch temperature for the third storage compartment RMF to be lower than the notch temperature for the cooling operation of the first storage compartment OCR. Accordingly, the temperature of the third storage compartment RMF is lower than that of the first storage compartment OCR.

Next, when the first storage compartment OCR is in an operable mode, the controller 310 may be configured to perform a first operation step operated based on the first notch temperature for the cooling operation of the first storage compartment OCR (S815).

Figure 12:
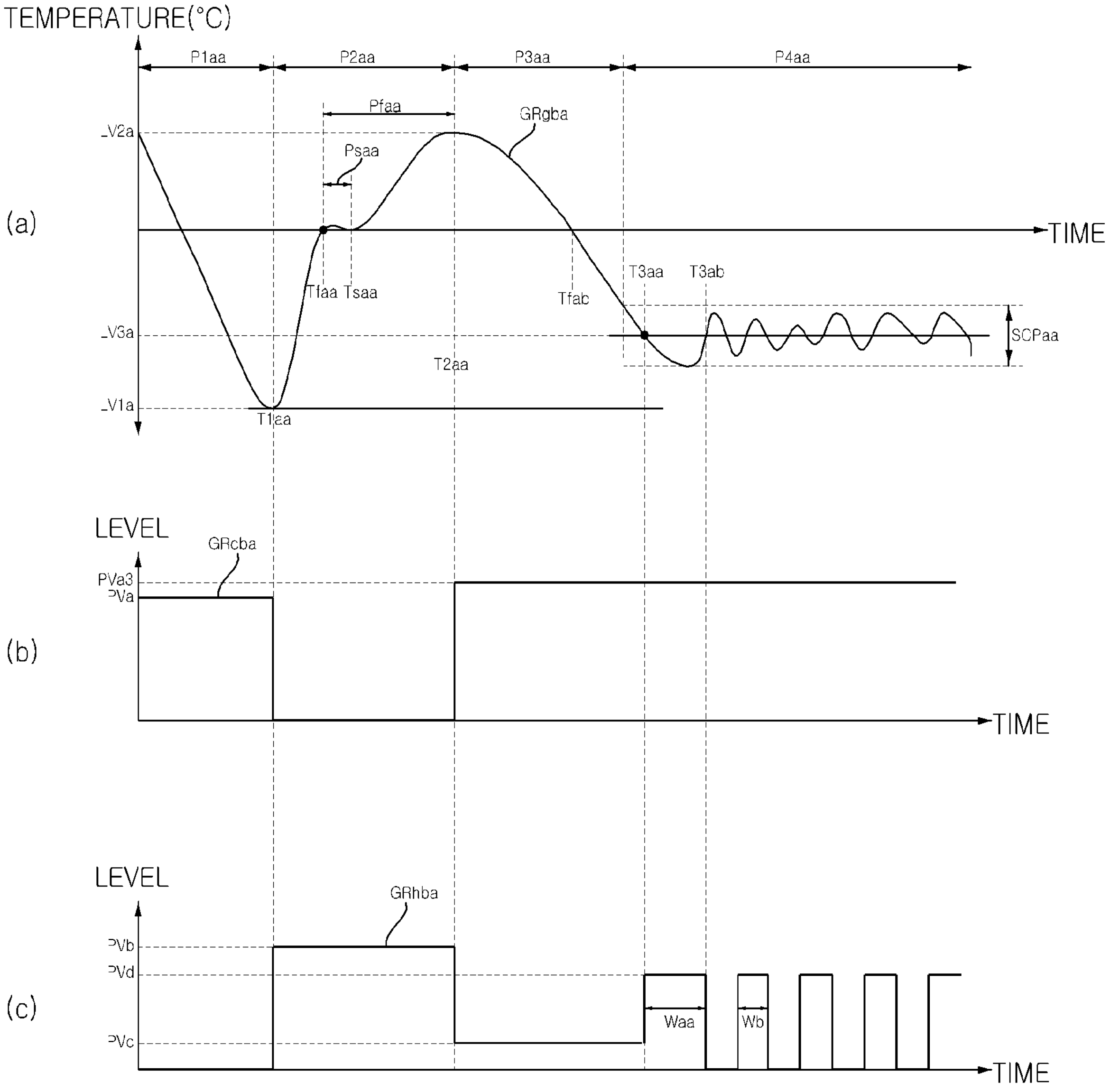
FIGS. 12 to 20 are diagrams referenced for description of the operation method of FIGS. 10A to 11.

The first operation step may correspond to a first supercooling mode or a first supercooling section (P1*aa* in FIG. 12).

For example, the controller 310 may be configured to operate a fan to supply cold at the evaporator 122 performing heat exchange using the refrigerant compressed in the compressor 112 to the first storage compartment OCR during the first operation step.

For example, the controller 310 may be configured to operate the heat absorption surface of the thermoelectric element during the first operation step to supply cold generated on the heat absorption surface to the first storage compartment OCR.

Specifically, during the first operation step, the controller 310 may be configured to operate the fan (FAa in FIG. 15) to supply cold generated by heat exchange on the heat absorption surface of the thermoelectric element to the cavity CAV.

Meanwhile, the controller 310 may be configured to supply cold to the cavity CAV inside the first storage compartment OCR or supercooling chamber during the first operation step and sequentially decrease the temperature of the goods MAT.

In this case, the controller 310 may be configured to control the output of the water molecule freezing preventing device WPF to be zero during the first operation step when the first operation step (P1*aa* in FIG. 12) is performed. Accordingly, power consumption by the water molecule freezing preventing device WPF may be reduced.

As another example, the controller 310 may be configured to operate the water molecule freezing preventing device WPF while supplying cold into the cavity CAV inside the first storage compartment OCR during the first operation step so that the temperature of the goods MAT sequentially decreases.

Next, the controller 310 determines whether the supercooling is released (S820), and when the supercooling is released, the controller 310 may be configured to perform a second operation step operated based on the second notch temperature for the heating operation of the first storage compartment OCR (S825).

The second operation step may correspond to the thawing mode or the thawing section (P2*aa* in FIG. 12). Accordingly, after Step 825 (S825), the first storage compartment OCR may operate in the thawing mode.

For example, the controller 310 may determine that the supercooling is released when the temperature of the goods MAT decreases to a first target temperature.

As another example, the controller 310 may determine that the supercooling is released when the temperature of the goods MAT increases after decreasing.

As another example, the controller 310 may determine that the supercooling is released when the difference between the temperature at the outlet and the temperature at the inlet of the cavity CAV increases and then decreases.

As another example, the controller 310 may determine that the supercooling is released when the temperature of the outlet of the cavity CAV decreases and then increases.

As another example, the controller 310 may determine that the supercooling is released when a change rate of the difference between the temperature at the outlet and the temperature at the inlet of the cavity CAV is equal to or more than a predetermined value.

As another example, the controller 310 determines that the supercooling state of the goods MAT is released when a first change rate, which is the difference between the outlet temperature and the inlet temperature of the cavity CAV during the operation of the fan FAa for supplying cold, is equal to or more than a first reference value, and a second change rate, which is the difference between the outlet temperature and the inlet temperature of the cavity CAV when the fan FAa is turned off, is equal to or more than a second reference value.

Meanwhile, when the supercooling is released, the goods MAT are in a liquid state according to the supercooling mode, and then rapidly undergo a phase change to change to a solid state.

The controller 310 preferably performs a release mode so as not to freeze the goods MAT in order to maintain the freshness of the goods MAT.

Meanwhile, the controller 310 may be configured to operate the heat source HS during the second operation step.

For example, the controller 310 may be configured to operate at least one of a heater or an RF output device 190*a* during the second operation step. Accordingly, the temperature increases during the second operation step.

Meanwhile, the controller 310 may be configured to operate the water molecule freezing preventing device WPF during the second operation step.

For example, the controller 310 may be configured to operate at least one of the RF output device, the electric field output device, the magnetic field output device, or the ultrasonic output device.

The controller 310 may be configured to control the output of the water molecule freezing preventing device WPF during the execution of the second operation step (P2*aa* in FIG. 12) to be greater than the output thereof during the execution of the first operation step (P1*aa* in FIG. 12).

Meanwhile, during the second operation step, the controller 310 may be configured to stop the supply of the cold into the cavity CAV inside the first storage compartment OCR, supply heat, and sequentially increase the temperature of the goods MAT.

Alternatively, during the second operation step, the controller 310 may be configured to decrease the supply of the cold into the cavity CAV inside the first storage compartment OCR, supply heat, and sequentially increase the temperature of the goods MAT.

Next, the controller 310 determines whether the thawing is complete (S830), and when the thawing is complete, the controller 310 may be configured to perform a third operation step operated based on the third notch temperature for the cooling operation of the first storage compartment OCR (S835).

The third operation step may correspond to the second supercooling mode or the second supercooling section (P3*aa* in FIG. 12).

For example, the controller 310 may determine that thawing is complete when the temperature of the goods MAT increases to a set thawing completion temperature. The set thawing completion temperature at this time is preferably greater than 0° C.

As another example, the controller 310 may determine that the thawing is complete when the temperature of the goods MAT increase and then decreases.

As another example, the controller 310 may determine that the thawing is complete when the difference between the temperature at the outlet and the temperature at the inlet of the cavity CAV is greater than zero.

As another example, the controller 310 may determine that the thawing of the goods MAT ends when the difference between the outlet temperature and inlet temperature of the cavity CAV when the fan FAa is off is greater than zero, and the second change rate which is the difference between the outlet temperature and the inlet temperature of the cavity CAV when the fan FAa is off is equal to or more than the second reference value.

The controller 310 may be configured to operate the heat source HS during the third operation step.

In this case, it is preferable that the second notch temperature is higher than 0° C., and the third notch temperature to be lower than the first notch temperature. Accordingly, it may be possible to efficiently supply cold or heat until reaching the supercooling maintaining section.

Meanwhile, the controller 310 may be configured to control the output of the water molecule freezing preventing device WPF to be zero during the third operation step.

Meanwhile, the controller 310 may be configured to control the output of the water molecule freezing preventing device WPF during the execution of the third operation step (P3*aa* in FIG. 12) to be greater than or equal to the output of the water molecule freezing preventing device WPF during the execution of the first operation step (P1*aa* in FIG. 12).

For example, the controller 310 may be configured to supply cold to the cavity CAV inside the supercooling chamber OCR during the third operation step and sequentially decrease the temperature of the goods MAT.

As another example, the controller 310 may be configured to output the RF while cold is supplied into the cavity CAV inside the supercooling chamber OCR during the third operation step and sequentially decrease the temperature of the goods MAT.

It is preferable that the magnitude or intensity of the RF when the second supercooling mode is performed is greater than the magnitude or intensity of the RF when the first supercooling mode is performed.

Meanwhile, it is preferable that the magnitude of the temperature change rate when the second supercooling mode is performed is less than the magnitude of the temperature change rate when the first supercooling mode is performed.

That is, it is preferable that a temperature drop during the execution of the second supercooling mode occurs more slowly than a temperature drop during the execution of the first supercooling mode.

Next, the controller 310 may determine whether the second target temperature is reached during the execution of the second supercooling mode (S840), and when it is determined that the second target temperature is reached, the controller 310 may be configured to perform the supercooling maintenance mode (S845).

The second target temperature at this time is a temperature higher than the supercooling release temperature, and is preferably higher than the above-described first target temperature.

When the second target temperature is reached, the controller 310 may be configured to control the supply of the heat to be turned on or off repeatedly while cold is supplied into the cavity CAV inside the first storage compartment OCR.

Meanwhile, the controller 310 may be configured to control a heat supply period Waa to be greater than a remaining heat supply period Wb during the execution of the supercooling maintenance mode. Accordingly, it may be possible to efficiently maintain the supercooling.

Meanwhile, the controller 310 may be configured to perform Step S860 when the second target temperature is not reached during the second supercooling mode.

The controller 310 may determine whether the supercooling is released in a state where the second target temperature is not reached during the execution of the second supercooling mode (S860), and when it is determined that the supercooling is released, the controller 310 may be configured to perform a fourth operation step operated based on a fourth notch temperature for the heating operation of the first storage compartment OCR (S865).

In this case, the fourth notch temperature may be higher than 0° C.

The fourth operation step may correspond to the thawing mode or the thawing section. Accordingly, after Step 865 (S865), the first storage compartment OCR may operate in the thawing mode.

Meanwhile, the controller 310 may be configured to operate the heat source HS during the fourth operation step.

For example, the controller 310 may be configured to operate at least one of a heater or an RF output device 190*a* during the fourth operation step. Accordingly, the temperature increases during the fourth operation step.

Meanwhile, the controller 310 may be configured to control the fourth notch temperature to be higher than the second notch temperature when a time elapsed from a time when an operation start condition of the second operation step (P2*aa* in FIG. 12) is satisfied to a time when an operation end condition of the second operation step (P2*aa* in FIG. 12) is satisfied exceeds a predetermined range. Accordingly, it may be possible to efficiently supply the cold or heat until reaching the supercooling maintaining section.

Meanwhile, the controller 310 may be configured to control the fourth notch temperature to be equal to the second notch temperature when the time elapsed from the time when the operation start condition of the second operation step (P2*aa* in FIG. 12) is satisfied to the time when the operation end condition of the second operation step (P2*aa* in FIG. 12) is satisfied is within the predetermined range. Accordingly, it may be possible to efficiently supply the cold or heat until reaching the supercooling maintaining section.

Meanwhile, the controller 310 may be configured to control the fourth notch temperature to be lower than the second notch temperature when the time elapsed from the time when the operation start condition of the second operation step (P2*aa* in FIG. 12) is satisfied to the time when the operation end condition of the second operation step (P2*aa* in FIG. 12) is satisfied is less than the predetermined range. Accordingly, it may be possible to efficiently supply the cold or heat until reaching the supercooling maintaining section.

Meanwhile, the controller 310 may be configured to control the fourth notch temperature to be higher than the second notch temperature when the temperature of the first storage compartment OCR exceeds a predetermined temperature from the time when the operation start condition of the second operation step (P2*aa* in FIG. 12) is satisfied to the time when the operation end condition of the second operation step (P2*aa* in FIG. 12) is satisfied. Accordingly, it may be possible to efficiently supply the cold or heat until reaching the supercooling maintaining section.

The controller 310 may be configured to control the fourth notch temperature to be equal to the second notch temperature when the temperature of the first storage compartment OCR is within the predetermined temperature from the time when the operation start condition of the second operation step (P2*aa* in FIG. 12) is satisfied to the time when the operation end condition of the second operation step (P2*aa* in FIG. 12) is satisfied. Accordingly, it may be possible to efficiently supply the cold or heat until reaching the supercooling maintaining section.

The controller 310 may be configured to control the fourth notch temperature to be lower than the second notch temperature when the temperature of the first storage compartment OCR is less than the predetermined temperature from the time when the operation start condition of the second operation step (P2*aa* in FIG. 12) is satisfied to the time when the operation end condition of the second operation step (P2*aa* in FIG. 12) is satisfied. Accordingly, it may be possible to efficiently supply the cold or heat until reaching the supercooling maintaining section.

Meanwhile, the controller 310 of the refrigerator according to another embodiment of the present disclosure may be configured to operate the first operation step (P1*aa* in FIG. 12) based on the first notch temperature for the cooling operation of the first storage compartment OCR, operate the second operation step (P2*aa* in FIG. 12) based on the second notch temperature for the heating operation of the first storage compartment OCR, and operate the third operation step (P3*aa* in FIG. 12) based on the third notch temperature for the cooling operation of the first storage compartment OCR are performed. Accordingly, it may be possible to efficiently supply the cold or heat until reaching the supercooling maintaining section.

The controller 310 of the refrigerator may be configured to control a total amount of cold supplied to the first storage compartment OCR in the third operation step (P3*aa* in FIG. 12) to be greater than a total amount of cold supplied to the first storage compartment OCR in the first operation step (P1*aa* in FIG. 12). Accordingly, it may be possible to efficiently supply the cold or heat until reaching the supercooling maintaining section.

The controller 310 of the refrigerator according to yet another embodiment of the present disclosure may be configured to operate the first operation step (P1*aa* in FIG. 12) based on the first notch temperature for the cooling operation of the first storage compartment OCR, operate the second operation step (P2*aa* in FIG. 12) based on the second notch temperature for the heating operation of the first storage compartment OCR, and operate the third operation step (P3*aa* in FIG. 12) based on the third notch temperature for the cooling operation of the first storage compartment OCR. Accordingly, it may be possible to efficiently supply cold or heat until reaching the supercooling maintaining section.

The controller 310 of the refrigerator may be configured to control the output of the water molecule freezing preventing device WPF in the third operation step (P3*aa* in FIG. 12) to be greater than or equal to the output of the water molecule freezing preventing device WPF in the first operation step (P1*aa* in FIG. 12). Accordingly, it may be possible to efficiently supply the cold or heat until reaching the supercooling maintaining section.

Figure 10A:
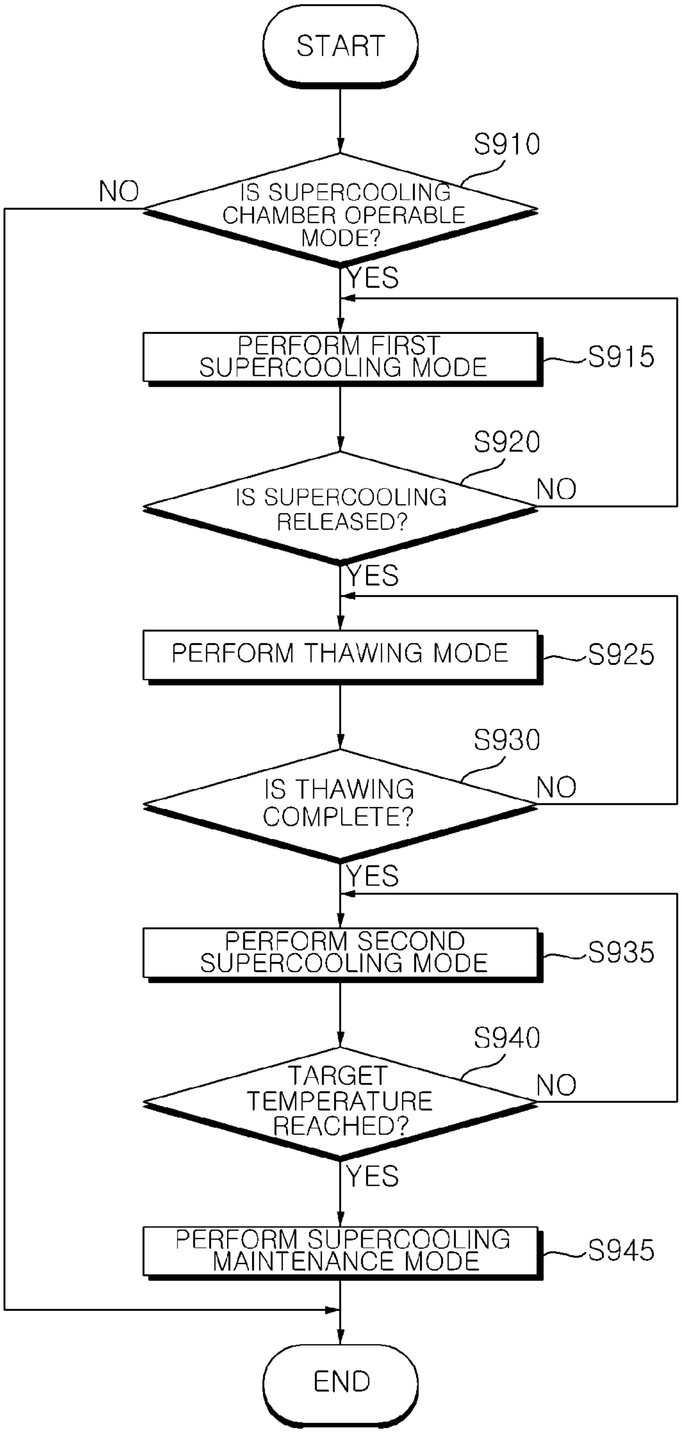
FIG. 10A is a flowchart illustrating a method of operating a refrigerator according to another embodiment of present disclosure.

FIG. 10A is a flowchart illustrating a method of operating a refrigerator according to another embodiment of present disclosure. For example, the flowchart may be a controller executing instructions stored in a semi-conductor memory, a storage media, and the like.

Referring to FIG. 10A, the controller 310 determines whether the supercooling chamber OCRa and/or OCRb is in an operable mode (S910). The supercooling chamber will be referred to as a first storage compartment OCR.

For example, when an operation button associated with the first storage compartment OCR is turned on, the controller 310 may be configured to operate the first storage compartment OCR.

As another example, when the operation button associated with the first storage compartment OCR is turned off, the controller 310 may be configured not to operate the first storage compartment OCR.

Next, when the first storage compartment OCR is in an operable mode, the controller 310 may be configured to perform the first supercooling mode (S915).

For example, the controller 310 may be configured to supply cold into the cavity CAV inside the first storage compartment OCR and sequentially decrease the temperature of the goods MAT.

As another example, the controller 310 may be configured to output the RF signal while cold is supplied into the cavity CAV inside the supercooling chamber OCR and sequentially decrease the temperature of the goods MAT.

Next, the controller 310 may determine whether supercooling is released (S920), and when it is determined that the supercooling is released, the controller 310 may be configured to end the first supercooling mode and perform the thawing mode (S925).

For example, the controller 310 may determine that the supercooling is released when the temperature of the goods MAT decreases to a first target temperature.

As another example, the controller 310 may determine that the supercooling is released when the temperature of the goods MAT increases after decreasing.

As another example, the controller 310 may determine that the supercooling is released when the difference between the temperature at the outlet and the temperature at the inlet of the cavity CAV increases and then decreases.

As another example, the controller 310 may determine that the supercooling is released when the temperature of the outlet of the cavity CAV decreases and then increases.

As another example, the controller 310 may determine that the supercooling is released when a change rate of the difference between the temperature at the outlet and the temperature at the inlet of the cavity CAV is equal to or more than a predetermined value.

As another example, the controller 310 may determine that the supercooling state of the goods MAT is released when the first change rate, which is the difference between the outlet temperature and the inlet temperature of the cavity CAV during the operation of the fan FAa for supplying cold, is equal to or more than the first reference value, and the second change rate, which is the difference between the outlet temperature and the inlet temperature of the cavity CAV when the fan FAa is turned off, is equal to or more than the second reference value.

Meanwhile, when the supercooling is released, the goods MAT are in a liquid state according to the supercooling mode, and then rapidly undergo a phase change to change to a solid state.

The controller 310 preferably performs the release mode so as not to freeze the goods MAT in order to maintain the freshness of the goods MAT.

Meanwhile, the controller 310 may be configured to stop the supply of the cold into the cavity CAV inside the first storage compartment OCR, supply heat, and sequentially increase the temperature of the goods MAT.

Alternatively, the controller 310 may be configured to decrease the supply of the cold into the cavity CAV inside the first storage compartment OCR, supply heat, and sequentially increase the temperature of the goods MAT.

Next, the controller 310 determines whether the thawing is complete (S930), and when it is determined that the thawing is complete, the controller 310 may be configured to perform the second cooling mode (S935).

For example, the controller 310 may determine that the thawing is complete when the temperature of the goods MAT increases to a set thawing completion temperature. The set thawing completion temperature at this time is preferably greater than 0° C.

As another example, the controller 310 may determine that the thawing is complete when the temperature of the goods MAT increases and then deceases.

As another example, the controller 310 may determine that the thawing is complete when the difference between the temperature at the outlet and the temperature at the inlet of the cavity CAV is greater than zero.

As another example, the controller 310 may determine that the thawing of the goods MAT ends when the difference between the outlet temperature and inlet temperature of the cavity CAV when the fan FAa is off is greater than zero, and the second change rate which is the difference between the outlet temperature and the inlet temperature of the cavity CAV when the fan FAa is off is equal to or more than the second reference value.

For example, the controller 310 may be configured to supply cold to the cavity CAV inside the first storage compartment OCR during the third operation step and sequentially decrease the temperature of the goods MAT.

As another example, the controller 310 may be configured to output the RF while cold is supplied to the cavity CAV inside the first storage compartment OCR and sequentially decrease the temperature of the goods MAT.

It is preferable that the magnitude or intensity of the RF when the second supercooling mode is performed is greater than the magnitude or intensity of the RF when the first supercooling mode is performed.

Meanwhile, it is preferable that the magnitude of the temperature change rate when the second supercooling mode is performed is less than the magnitude of the temperature change rate when the first supercooling mode is performed.

That is, it is preferable that a temperature drop during the execution of the second supercooling mode occurs more slowly than a temperature drop during the execution of the first supercooling mode.

Next, the controller 310 may determine whether the second target temperature is reached during the execution of the second supercooling mode (S940), and when it is determined that the second target temperature is reached, the controller 310 may be configured to perform the supercooling maintenance mode (S945).

The second target temperature at this time is a temperature higher than the supercooling release temperature, and is preferably higher than the above-described first target temperature.

When the second target temperature is reached, the controller 310 may be configured to control the supply of the heat to be turned on or off repeatedly while cold is supplied into the cavity CAV inside the first storage compartment OCR.

Meanwhile, the controller 310 may be configured to control the heat supply period Waa to be greater than the remaining heat supply period Wb during the execution of the supercooling maintenance mode. Accordingly, it may be possible to efficiently maintain the supercooling.

Figure 10B:
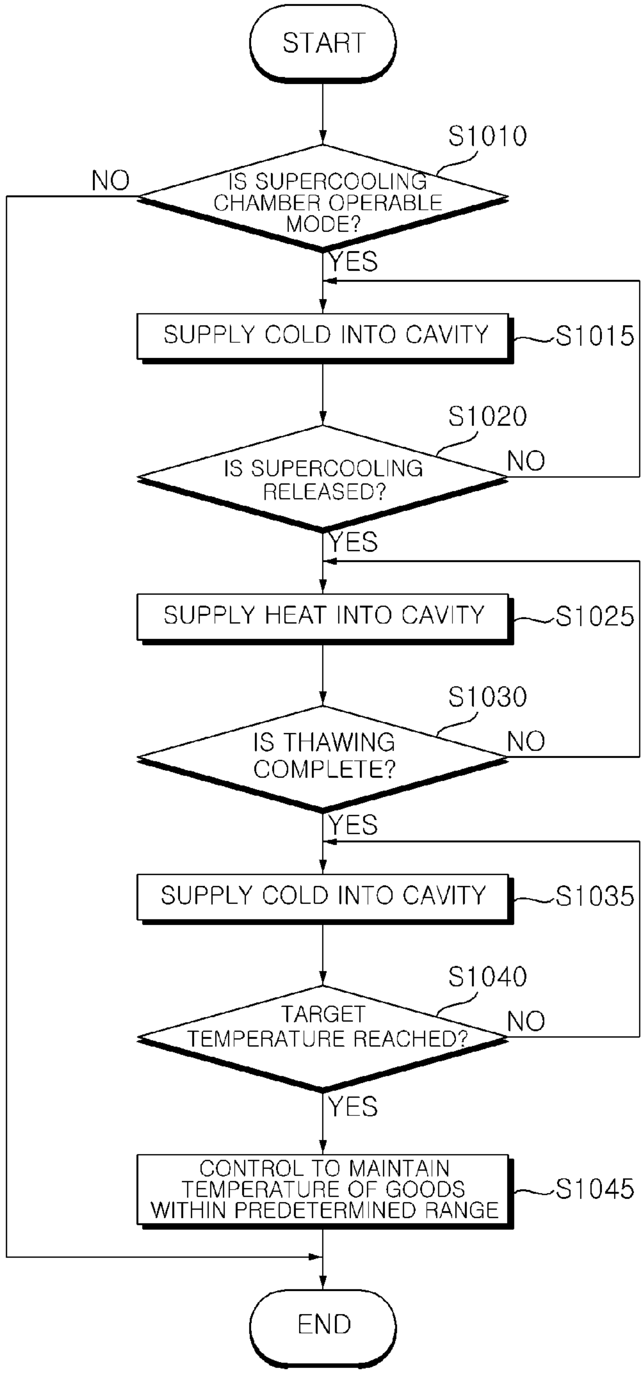
FIG. 10B is a flowchart illustrating a method of operating a refrigerator according to yet another embodiment of present disclosure.

FIG. 10B is a flowchart illustrating a method of operating a refrigerator according to yet another embodiment of present disclosure. For example, the flowchart may be a controller executing instructions stored in a semi-conductor memory, a storage media, and the like.

Referring to FIG. 10B, the controller 310 determines whether the supercooling chamber OCRa and/or OCRb is in an operable mode (S1010). The supercooling chamber will be referred to as a first storage compartment OCR.

For example, when the operation button associated with the first storage compartment OCR is turned on, the controller 310 may be configured to operate the first storage compartment OCR.

Next, when the first storage compartment OCR is in the operable mode, the controller 310 may be configured to supply cold to the cavity CAV and sequentially decrease the temperature of the goods MAT (S1015).

Meanwhile, the controller 310 may be configured to output the RF while cold is supplied into the cavity CAV inside the first storage compartment OCR and sequentially decrease the temperature of the goods MAT.

Next, the controller 310 may determine whether the supercooling is released (S1020), and when it is determined that the supercooling is released, the controller 310 may be configured to supply the heat to the cavity CAV and sequentially increase the temperature of the goods MAT (S1025).

For example, the controller 310 may determine that the supercooling is released when the temperature of the goods MAT decreases to the first target temperature.

As another example, the controller 310 may determine that the supercooling is released when the temperature of the goods MAT increases after decreasing.

As another example, the controller 310 may determine that the supercooling is released when the difference between the temperature at the outlet and the temperature at the inlet of the cavity CAV increases and then decreases.

As another example, the controller 310 may determine that the supercooling state of the goods MAT is released when the first change rate, which is the difference between the outlet temperature and the inlet temperature of the cavity CAV during the operation of the fan FAa for supplying cold, is equal to or more than the first reference value, and the second change rate, which is the difference between the outlet temperature and the inlet temperature of the cavity CAV when the fan FAa is turned off, is equal to or more than the second reference value.

Meanwhile, when the supercooling is released, the goods MAT are in a liquid state according to the supercooling mode, and then rapidly undergo a phase change to change to a solid state.

The controller 310 preferably performs the release mode so as not to freeze the goods MAT in order to maintain the freshness of the goods MAT.

In a case where the supercooling is released, the controller 310 may be configured to stop the supply of cold, supply heat in the cavity CAV, and sequentially increase the temperature of the goods MAT. According to the stop of the supply of the cold, it may be possible to efficiently manage refrigerator power consumption.

Meanwhile, the controller 310 may be configured to decrease the supply of the cold into the cavity CAV inside the first storage compartment OCR, supply heat, and sequentially increase the temperature of the goods MAT.

Next, the controller 310 determines whether the thawing is complete (S1030), and when it is determined that the thawing is complete, the controller 310 may be configured to supply cold into the cavity CAV inside the first storage compartment OCR and sequentially decrease the temperature of the goods MAT (S1035).

For example, the controller 310 may determine that the thawing is complete when the temperature of the goods MAT increases to a set thawing completion temperature. The set thawing completion temperature at this time is preferably greater than 0° C.

As another example, the controller 310 may determine that thawing is complete when the temperature of the goods MAT increases and then decreases.

As another example, the controller 310 may determine that the thawing of the goods MAT ends when the difference between the outlet temperature and inlet temperature of the cavity CAV when the fan FAa is off is greater than zero, and the second change rate which is the difference between the outlet temperature and the inlet temperature of the cavity CAV when the fan FAa is off is equal to or more than the second reference value.

When the thawing is complete, the controller 310 may be configured to output the RF while the cold is supplied to the cavity CAV inside the first storage compartment OCR and sequentially decrease the temperature of the goods MAT.

Meanwhile, it is preferable that the magnitude of the temperature change rate when the second supercooling mode is performed is less than the magnitude of the temperature change rate when the first supercooling mode is performed.

That is, it is preferable that the temperature drop during the execution of the second supercooling mode occurs more slowly than the temperature drop during the execution of the first supercooling mode.

Next, the controller 310 may determine whether the second target temperature is reached during the execution of the second supercooling mode (S1040), and when it is determined that the second target temperature is reached, the controller 310 may be configured to maintain within a predetermined range SCPaa based on the second target temperature (S1045).

The second target temperature at this time is a temperature higher than the supercooling release temperature, and is preferably higher than the above-described first target temperature.

When the second target temperature is reached, the controller 310 may be configured to control the supply of the heat to be turned on or off repeatedly while cold is supplied into the cavity CAV inside the first storage compartment OCR.

Accordingly, the temperature of the goods MAT can be maintained within a predetermined range SCPaa based on the second target temperature.

Meanwhile, the controller 310 may be configured to control the heat supply period Waa to be greater than the remaining heat supply period Wb during the execution of the supercooling maintenance mode. Accordingly, it may be possible to efficiently maintain the supercooling.

Figure 11:
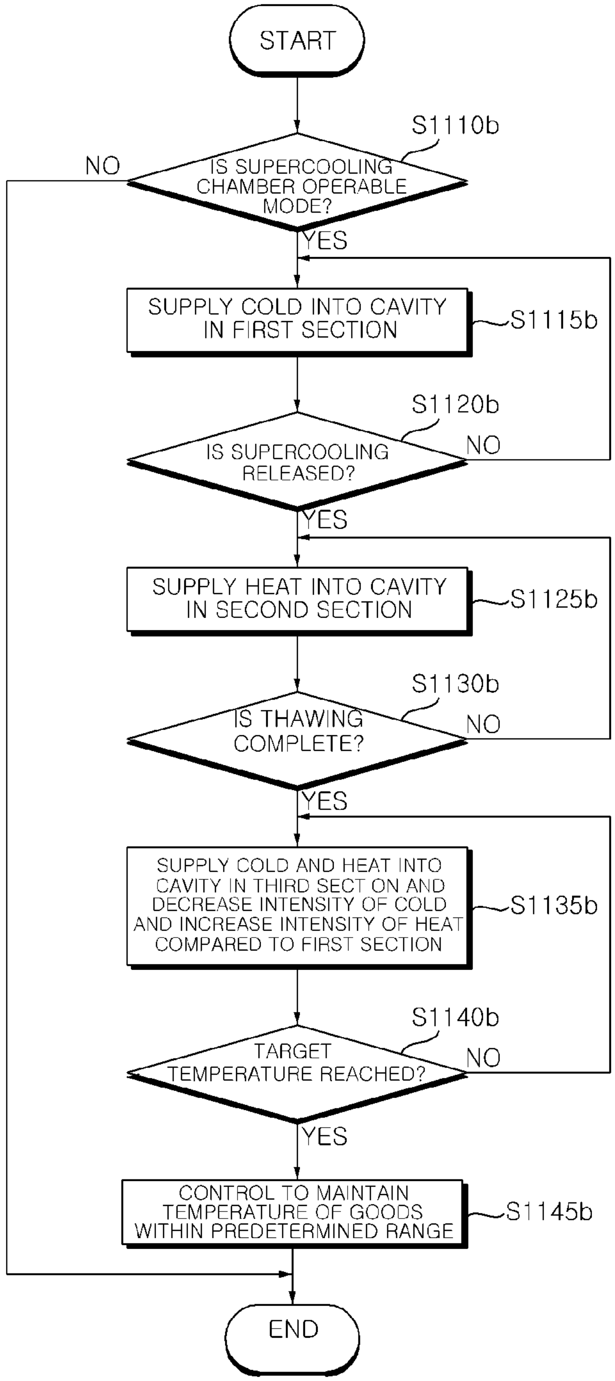
FIG. 11 is a flowchart illustrating a method of operating a refrigerator according to yet another embodiment of present disclosure.

FIG. 11 is a flowchart illustrating a method of operating a refrigerator according to yet another embodiment of present disclosure. For example, the flowchart may be a controller executing instructions stored in a semi-conductor memory, a storage media, and the like.

Referring to FIG. 11, the controller 310 determines whether the supercooling chamber OCRa and/or OCRb is in the operable mode (S1110*b*). The supercooling chamber will be referred to as a first storage compartment OCR.

For example, when the operation button associated with the first storage compartment OCR is turned on, the controller 310 may be configured to operate the first storage compartment OCR.

Next, when the first storage compartment OCR is in the operable mode, the controller 310 may be configured to supply cold into the cavity CAV in the first section P1*aa* and sequentially decrease the temperature of the goods MAT (S1115*b*).

Meanwhile, the controller 310 may be configured to output the RF while the cold is supplied into the cavity CAV inside the first storage compartment OCR and sequentially decrease the temperature of the goods MAT.

Next, the controller 310 determines whether supercooling is released (S1120*a*), and when it is determined that the supercooling is released, the controller 310 may be configured to supply heat to the cavity CAV in the second section P2*aa* after the first section P1*aa* and sequentially increase the temperature of the goods MAT (S1125*b*).

For example, the controller 310 may determine that the supercooling is released when the temperature of the goods MAT decreases to the first target temperature. In this case, the first target temperature may correspond to the supercooling release temperature.

As another example, the controller 310 may determine that the supercooling is released when the temperature of the goods MAT increases after decreasing.

As another example, the controller 310 may determine that the supercooling is released when the difference between the temperature at the outlet and the temperature at the inlet of the cavity CAV increases and then decreases.

As another example, the controller 310 may determine that the supercooling state of the goods MAT is released when the first change rate, which is the difference between the outlet temperature and the inlet temperature of the cavity CAV during the operation of the fan FAa for supplying cold, is equal to or more than the first reference value, and the second change rate, which is the difference between the outlet temperature and the inlet temperature of the cavity CAV when the fan FAa is turned off, is equal to or more than the second reference value.

Meanwhile, when supercooling is released, the goods MAT are in a liquid state according to the supercooling mode, and then rapidly undergo a phase change to change to a solid state.

The controller 310 preferably performs the release mode so as not to freeze the goods MAT in order to maintain the freshness of the goods MAT.

In the case where the supercooling is released, the controller 310 may be configured to stop the supply of cold, supply heat into the cavity CAV in the second section P2*aa* after the first section P1*aa* and sequentially increase the temperature of goods MAT. According to the stop of the supply of the cold, it may be possible to efficiently manage refrigerator power consumption.

Meanwhile, as an example of heat, heat by a heater (not illustrated) and the RF by the RF output device 190*a* may be exemplified, and hereinafter, the output of the RF will be mainly described.

Meanwhile, the controller 310 may be configured to decrease the supply of the cold into the cavity CAV inside the first storage compartment OCR, supply heat, and sequentially increase the temperature of the goods MAT.

Next, the controller 310 determines whether the thawing is complete (S1130*b*), and when it is determined that the thawing is complete, in the third section P3*aa* after the second section P2*aa*, the controller 310 may be configured to supply cold into the cavity CAV inside the first storage compartment OCR, to decrease the intensity of the cold, and to increase the intensity of the heat compared to in the first section (S1135*b*).

For example, the controller 310 may determine that the thawing is complete when the temperature of the goods MAT increases to the set thawing completion temperature. The set thawing completion temperature at this time is preferably greater than 0° C.

As another example, the controller 310 may determine that the thawing is complete when the temperature of the goods MAT increases and then decreases.

As another example, the controller 310 may determine that the thawing of the goods MAT ends when the difference between the outlet temperature and inlet temperature of the cavity CAV when the fan FAa is off is greater than zero, and the second change rate which is the difference between the outlet temperature and the inlet temperature of the cavity CAV when the fan FAa is off is equal to or more than the second reference value.

When the thawing is complete, the controller 310 may be configured to output the heat while the cold is supplied to the cavity CAV inside the first storage compartment OCR and sequentially decrease the temperature of the goods MAT.

In this case, an intensity PVa3 of the cold in the third section P3*aa* is controlled to be greater than the intensity PVa of the cold in the first section P1*aa*. Accordingly, it may be possible to efficiently maintain the supercooling without arranging for a temperature detector in the cavity CAV. In particular, it may be possible to efficiently supply the cold in the third section P3*aa*, which is the supercooling section.

Meanwhile, it is preferable that the magnitude of the temperature change rate when the second supercooling mode is performed is greater than the magnitude of the temperature change rate when the first supercooling mode is performed.

That is, it is preferable that the temperature drop during the execution of the second supercooling mode is performed more rapidly than the temperature drop during the execution of the first supercooling mode.

Next, the controller 310 may determine whether the second target temperature is reached during the execution of the second supercooling mode (S1140*b*), and when it is determined that the second target temperature is reached, the controller 310 may be configured to maintain within a predetermined range SCPaa based on the second target temperature (S1145*b*).

The second target temperature at this time is a temperature higher than the supercooling release temperature, and is preferably higher than the above-described first target temperature.

When the second target temperature is reached, the controller 310 may be configured to control the supply of the heat to be turned on or off repeatedly while cold is supplied into the cavity CAV inside the first storage compartment OCR.

Accordingly, the temperature of the goods MAT may be maintained within the predetermined range SCPaa based on the second target temperature.

Meanwhile, the controller 310 may be configured to control the heat supply period Waa to be greater than the remaining heat supply period Wb during the execution of the supercooling maintenance mode. Accordingly, it may be possible to efficiently maintain the supercooling.

FIG. 12 illustrates an example of a temperature graph GRgab of the goods, a cold graph GRcba corresponding to the temperature of the goods, and a heat graph GRhba.

Referring to FIG. 12, as illustrated in (a) of FIG. 12, the temperature of the goods MAT may sequentially decrease in the first section P1*aa*, the temperature of the goods MAT may sequentially increase in the second section P2*aa*, the temperature of the goods MAT may decrease sequentially in the third section P3*aa*, and the temperature of the goods MAT may be maintained within a predetermined range SCPaa based on the third temperature T3*aa* in a fourth section P4*aa*.

The controller 310 may be configured to sequentially decrease the temperature of the goods MAT to the first temperature T1*aa*, which is the supercooling set temperature or the first target temperature, in the first section P1*aa* according to the first supercooling mode.

To this end, the controller 310 may be configured to supply cold into the cavity CAV in the first section P1*aa*, as illustrated in (b) of FIG. 12.

In particular, the controller 310 may control the cold supply device 180 to supply cold having the intensity of PVa in the first section P1*aa*. Accordingly, the temperature of the goods MAT sequentially decreases to the first temperature T1*aa*.

Meanwhile, the controller 310 may be configured not to supply heat into the cavity CAV as illustrated in (c) of FIG. 12 in the first section P1*aa* which is the first supercooling mode.

Meanwhile, the controller 310 may determine that the supercooling is released when the temperature of the goods MAT decreases and then increases, and be configured to perform the thawing mode.

Accordingly, the controller 310 may be configured not to supply the cold into the cavity CAV in the second section P2*aa*, as illustrated in (b) of FIG. 12.

Moreover, the controller 310 may be configured to supply heat having the intensity of PVb in the second section P2*aa*, as illustrated in (c) of FIG. 12. Accordingly, the temperature of the goods MAT sequentially increases to the second temperature T2*aa*.

For example, the controller 310 may be configured to supply the heat into the cavity CAV using the RF output by operating the RF output device 190*a*.

In particular, in the Pfaa section of the second section P2*aa*, the thawing may be performed, and in the Psaa section, a portion of the goods MAT may be in a slush state.

Meanwhile, when the temperature of the goods MAT increases and then decreases, the controller 310 may determine that the thawing is complete, and be configured to perform the second supercooling mode.

Next, the controller 310 may be configured to sequentially decrease the temperature of the goods MAT to the third temperature T3*aa*, which is the second target temperature, in the third section P3*aa* according to the second supercooling mode.

The third temperature T3*aa* may be a temperature higher than the first temperature T1*aa* and may correspond to a supercooling maintenance temperature rather than a supercooling release temperature.

To this end, the controller 310 may be configured to control cold having the intensity of PVa3 greater than PVa of the first section P1*aa* to be supplied in the third section P3*aa*, as illustrated in (b) of FIG. 12. Accordingly, the temperature of the goods MAT sequentially decreases to the first temperature T1*aa*.

In particular, the controller 310 may be configured to control the intensity PVa3 of the cold in the third section P3*aa* to be greater than the intensity PVa of the cold in the first section P1*aa*, and thus, it may be possible to effectively supply the cold in the third sections P3*aa* which is the supercooling section.

Meanwhile, the controller 310 may be configured to supply heat having the intensity of PVc in the third section P3*aa*, as illustrated in (c) of FIG. 12.

In particular, the controller 310 may be configured to control the intensity of the heat supplied in the third section P3*aa* to be greater than the intensity of the heat supplied in the first section P1*aa*.

The controller 310 may be configured to control the magnitude of the temperature change rate S1*b* of the goods MAT in the third section P3*aa* to be greater than the magnitude of the temperature change rate Sla of the goods MAT in the first section P1*aa*.

Accordingly, the temperature of the goods MAT decreases rapidly in the third section P3*aa* which is the second supercooling mode compared to in the first section P1*aa* which is the first supercooling mode.

Meanwhile, the controller 310 may be configured to control the intensity PVc of the heat in the third section P3*aa* to be less than the intensity PVb of the heat in the second section P2*aa*.

The controller 310 may be configured to maintain the temperature of the goods MAT within the predetermined range SCPaa based on the third temperature T3*aa* in the fourth section P4*aa* after the third section P3*aa*. Accordingly, it may be possible to efficiently maintain the supercooling.

Meanwhile, the fourth section P4*aa* may be referred to as a supercooling maintaining section.

To this end, the controller 310 may be configured to supply cold having the intensity of PVa3 greater than PVa of the first section P1*aa*, as illustrated in (b) of FIG. 12, in the fourth section P4*aa*.

Meanwhile, during the fourth section P4*aa*, the controller 310 may be configured to supply the heat into the cavity CAV and control the supply of the heat to be turned on or off repeatedly, as illustrated in (c) of FIG. 12. Accordingly, it may be possible to efficiently maintain the supercooling.

Meanwhile, the controller 310 may be configured to control the first heat supply period Waa of the fourth section P4*aa* to be greater than the remaining heat supply periods Wb. Accordingly, it may be possible to efficiently maintain the supercooling.

Figure 13:
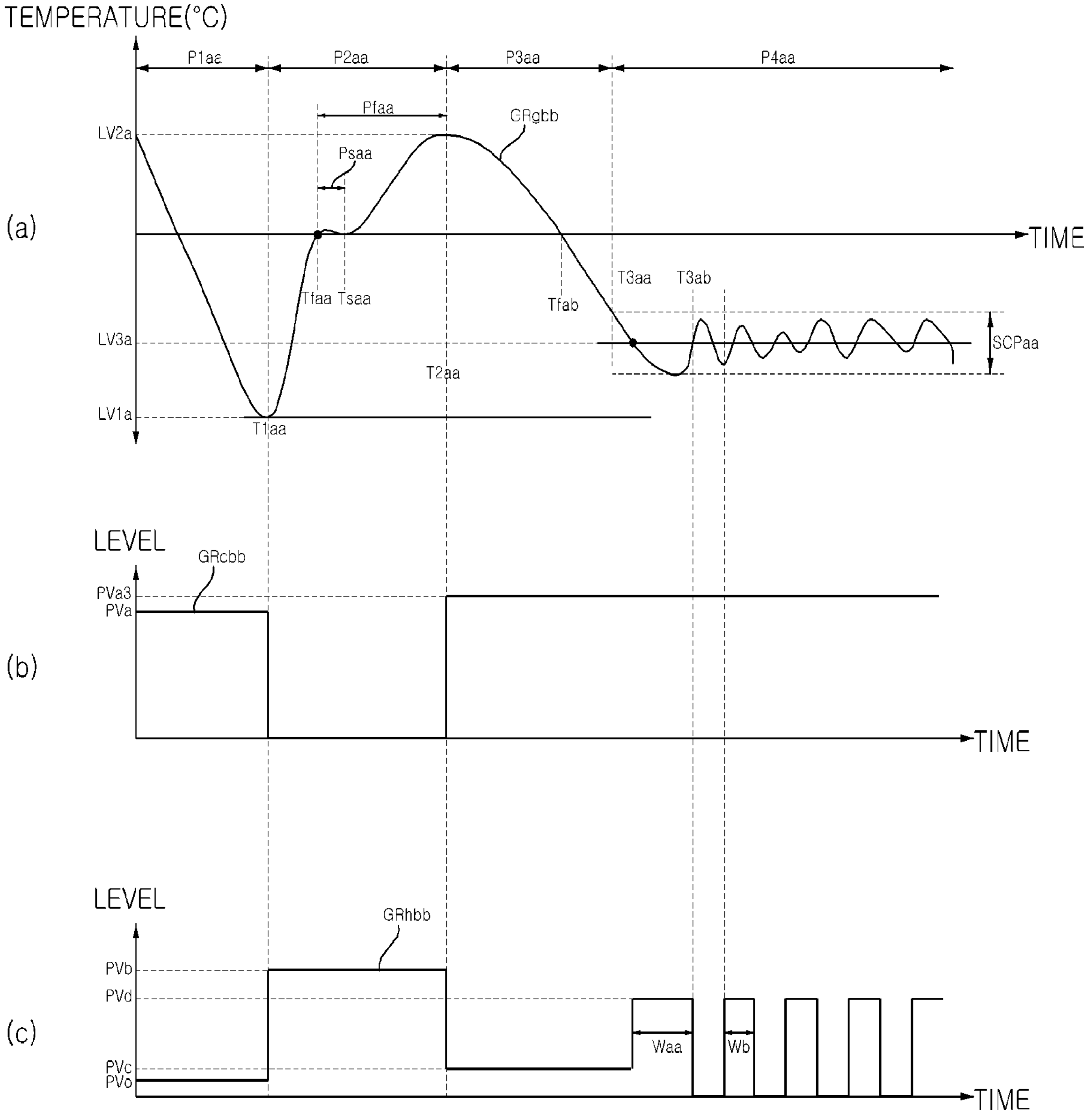

FIG. 13 illustrates another example of a temperature graph GRgbb of the goods, a cold graph GRcbb corresponding to the temperature of the goods, and a heat graph GRhbb.

Referring to the drawing, as illustrated in (a) of FIG. 13 the temperature of the goods MAT may sequentially decrease in the first section P1*aa*, the temperature of the goods MAT may sequentially increase in the second section P2*aa*, the temperature of the goods MAT may decrease sequentially in the third section P3*aa*, and the temperature of the goods MAT may be maintained within the predetermined range SCPaa based on the third temperature T3*aa* in the fourth section P4*aa*.

The controller 310 may be configured to sequentially decrease the temperature of the goods MAT to the first temperature T1*aa*, which is the supercooling set temperature or the first target temperature, in the first section P1*aa* according to the first supercooling mode.

To this end, the controller 310 may be configured to control the cold supply device 180 in the first section P1*aa*, and supply cold having the intensity of PVa in the first section P1*aa*, as illustrated in (b) of FIG. 13. Accordingly, the temperature of the goods MAT sequentially decreases to the first temperature T1*aa*.

Meanwhile, the controller 310 may be configured to supply heat having the intensity of PVo less than PVc and PVb into the cavity CAV as illustrated in (c) of FIG. 13 in the first section P1*aa* which is the first supercooling mode.

That is, the controller 310 may be configured to supply the heat having the intensity less than the intensity PVb of the heat in the second section P2*aa* to the cavity CAV in the first section P1*aa*. Accordingly, it may be possible to stably maintain the supercooling in the first section P1*aa*.

Meanwhile, the controller 310 may determine that the supercooling is released when the temperature of the goods MAT decreases and then increases, and be configured to perform the thawing mode.

Accordingly, the controller 310 may be configured to not supply the cold into the cavity CAV in the second section P2*aa*, as illustrated in (b) of FIG. 13.

Moreover, the controller 310 may be configured to supply heat having the intensity of PVb in the second section P2*aa*, as illustrated in (c) of FIG. 13. Accordingly, the temperature of the goods MAT sequentially increases to the second temperature T2*aa*.

For example, the controller 310 may be configured to supply the heat into the cavity CAV using the RF output by operating the RF output device 190*a*.

Meanwhile, when the temperature of the goods MAT increases and then decreases, the controller 310 may determine that the thawing is complete, and be configured to perform the second supercooling mode.

Next, the controller 310 may be configured to sequentially decrease the temperature of the goods MAT to the third temperature T3*aa*, which is the second target temperature, in the third section P3*aa* according to the second supercooling mode.

The third temperature T3*aa* may be a temperature higher than the first temperature T1*aa* and may correspond to the supercooling maintenance temperature rather than the supercooling release temperature.

To this end, the controller 310 may be configured to control cold having the intensity of PVa3 greater than PVa of the first section P1*aa* is supplied in the third section P3*aa*, as illustrated in (b) of FIG. 13. Accordingly, the temperature of the goods MAT sequentially decreases to the first temperature T1*aa*.

In particular, the controller 310 may be configured to control the intensity PVa3 of the cold in the third section P3*aa* to be greater than the intensity PVa of the cold in the first section P1*aa*, and thus, it may be possible to effectively supply the cold in the third sections P3*aa* which is the supercooling section.

Meanwhile, the controller 310 may be configured to supply heat having the intensity of PVc in the third section P3*aa*, as illustrated in (c) of FIG. 13.

The controller 310 may be configured to maintain the temperature of the goods MAT within the predetermined range SCPaa based on the third temperature T3*aa* in the fourth section P4*aa* after the third section P3*aa*. Accordingly, it may be possible to efficiently maintain the supercooling.

To this end, the controller 310 may be configured to supply cold having the intensity of PVa3 greater than PVa of the first section P1*aa*, as illustrated in (b) of FIG. 13, in the fourth section P4*aa*.

Meanwhile, during the fourth section P4*aa*, the controller 310 may be configured to supply the heat into the cavity CAV and control the supply of the heat to be turned on or off repeatedly, as illustrated in (c) of FIG. 13. Accordingly, it may be possible to efficiently maintain the supercooling.

Meanwhile, the controller 310 may be configured to control the first heat supply period Waa of the fourth section P4*aa* to be greater than the remaining heat supply periods Wb. Accordingly, it may be possible to efficiently maintain the supercooling.

Figure 14:
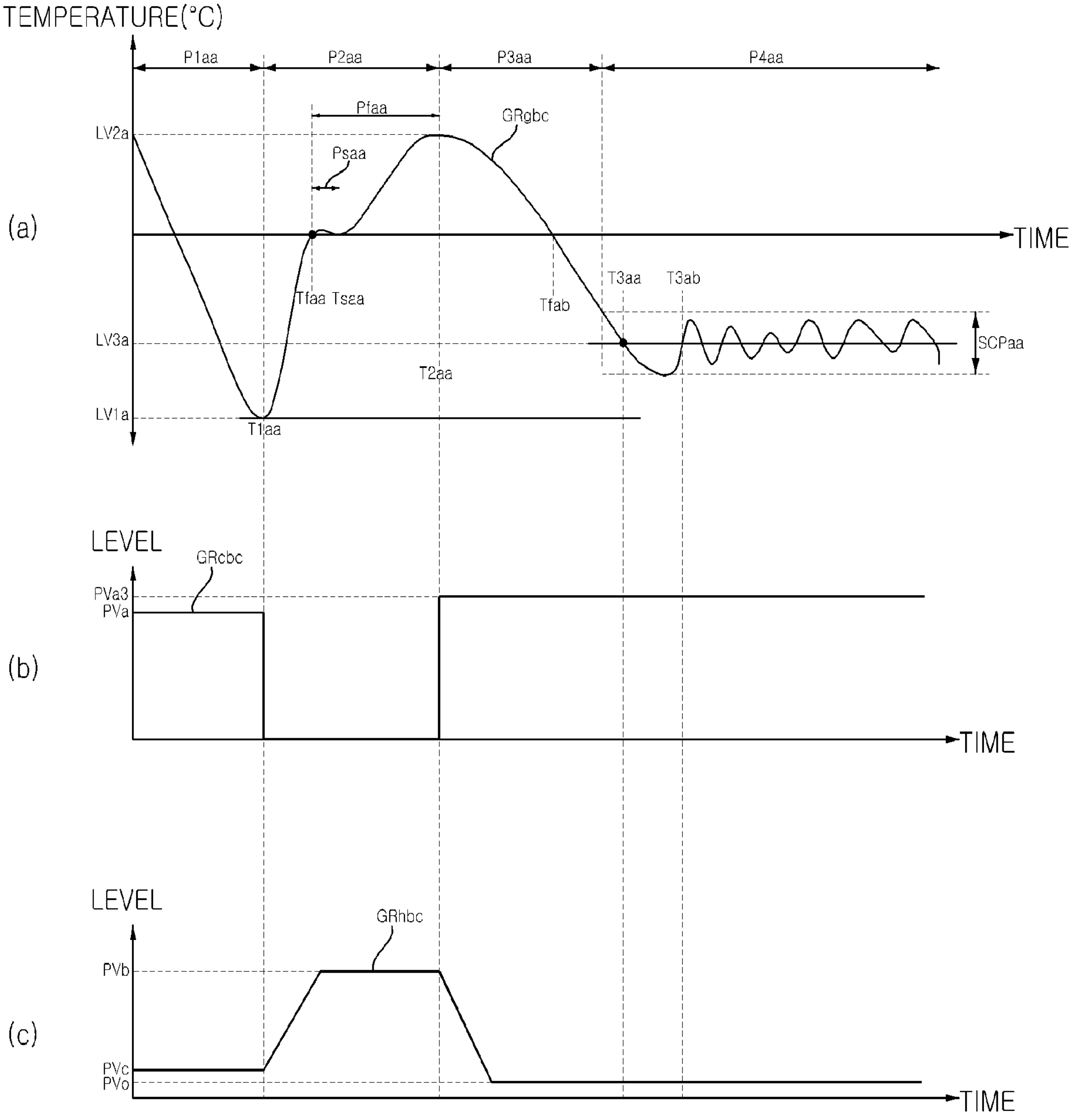

FIG. 14 illustrates yet another example of a temperature graph GRgbc of the goods, a cold graph GRcbc corresponding to the temperature of the goods, and a heat graph GRhbc.

Referring to the drawing, as illustrated in (a) of FIG. 14, the temperature of the goods MAT may sequentially decrease in the first section P1*aa*, the temperature of the goods MAT may sequentially increase in the second section P2*aa*, the temperature of the goods MAT may decrease sequentially in the third section P3*aa*, and the temperature of the goods MAT may be maintained within a predetermined range SCPaa based on the third temperature T3*aa* in the fourth section P4*aa*.

The controller 310 may be configured to sequentially decrease the temperature of the goods MAT to the first temperature T1*aa*, which is the supercooling set temperature or the first target temperature, in the first section P1*aa* according to the first supercooling mode.

To this end, the controller 310 may be configured to supply cold into the cavity CAV in the first section P1aa, as illustrated in (b) of FIG. 14.

In particular, the controller 310 may control the cold supply device 180 to supply cold having the intensity of PVa in the first section P1aa. Accordingly, the temperature of the goods MAT sequentially decreases to the first temperature T1aa.

Meanwhile, the controller 310 may be configured to supply heat having the intensity of PVc less than PVb into the cavity CAV as illustrated in (c) of FIG. 14 in the first section P1aa which is the first supercooling mode.

That is, the controller 310 may be configured to supply the heat having the intensity less than the intensity PVb of the heat in the second section P2aa to the cavity CAV in the first section P1aa. Accordingly, it may be possible to stably maintain the supercooling in the first section P1aa.

Meanwhile, the controller 310 may determine that the supercooling is released when the temperature of the goods MAT decreases and then increases, and be configured to perform the thawing mode.

Accordingly, the controller 310 may be configured to not supply the cold into the cavity CAV in the second section P2aa, as illustrated in (b) of FIG. 14.

Moreover, the controller 310 may be configured to supply heat which sequentially increases from PVc to PVb and then maintain the intensity of PVb in the second section P2aa, as illustrated in (c) of FIG. 14. Accordingly, the temperature of the goods MAT sequentially increases to the second temperature T2aa.

For example, the controller 310 may be configured to supply the heat into the cavity CAV using the RF output by operating the RF output device 190a.

In particular, in the Pfaa section of the second section P2aa, the thawing may be performed, and in the Psaa section, a portion of the goods MAT may be in a slush state.

Meanwhile, when the temperature of the goods MAT increases and then decreases, the controller 310 may determine that the thawing is complete, and be configured to perform the second supercooling mode.

Next, the controller 310 may be configured to sequentially decrease the temperature of the goods MAT to the third temperature T3aa, which is the second target temperature, in the third section P3aa according to the second supercooling mode.

The third temperature T3aa may be a temperature higher than the first temperature T1aa and may correspond to the supercooling maintenance temperature rather than the supercooling release temperature.

To this end, the controller 310 may be configured to control cold having the intensity of PVa3 greater than PVa of the first section P1aa to be supplied in the third section P3aa, as illustrated in (b) of FIG. 14. Accordingly, the temperature of the goods MAT sequentially decreases to the first temperature T1aa.

In particular, the controller 310 may be configured to control the intensity PVa3 of the cold in the third section P3aa to be greater than the intensity PVa of the cold in the first section P1aa, and thus, it may be possible to effectively supply the cold in the third sections P3aa which is the supercooling section.

Meanwhile, the controller 310 may be configured to supply heat which sequentially decreases from PVb to PVo and then maintain the intensity of PVo in the third section P3aa, as illustrated in (c) of FIG. 14.

In this case, the intensity of PVo may be less than that of PVc in the first section P1aa.

That is, the controller 310 may be configured to control the intensity of heat supplied in the third section P3aa to be less than the intensity of heat supplied in the first section P1aa.

The controller 310 may be configured to control the magnitude of the temperature change rate S1b of the goods MAT in the third section P3aa to be greater than the magnitude of the temperature change rate Sla of the goods MAT in the first section P1aa.

Accordingly, the temperature of the goods MAT decreases rapidly in the third section P3aa which is the second supercooling mode compared to in the first section P1aa which is the first supercooling mode.

Meanwhile, the controller 310 may be configured to control the intensity PVc of the heat in the third section P3aa to be less than the intensity PVb of the heat in the second section P2aa.

The controller 310 may be configured to maintain the temperature of the goods MAT within the predetermined range SCPaa based on the third temperature T3aa in the fourth section P4aa after the third section P3aa. Accordingly, it may be possible to efficiently maintain the supercooling.

To this end, the controller 310 may be configured to supply cold having the intensity of PVa3 greater than PVa of the first section P1aa, as illustrated in (b) of FIG. 14, in the fourth section P4aa.

Meanwhile, during the fourth section P4aa, the controller 310 may be configured to supply the heat into the cavity CAV, and particularly, and supply heat having the intensity of PVo, as illustrated in (c) of FIG. 14. Accordingly, it may be possible to efficiently maintain the supercooling.

FIGS. 15 to 20 are diagrams illustrating various examples of supercooling chambers according to an embodiment of present disclosure.

Figure 15:
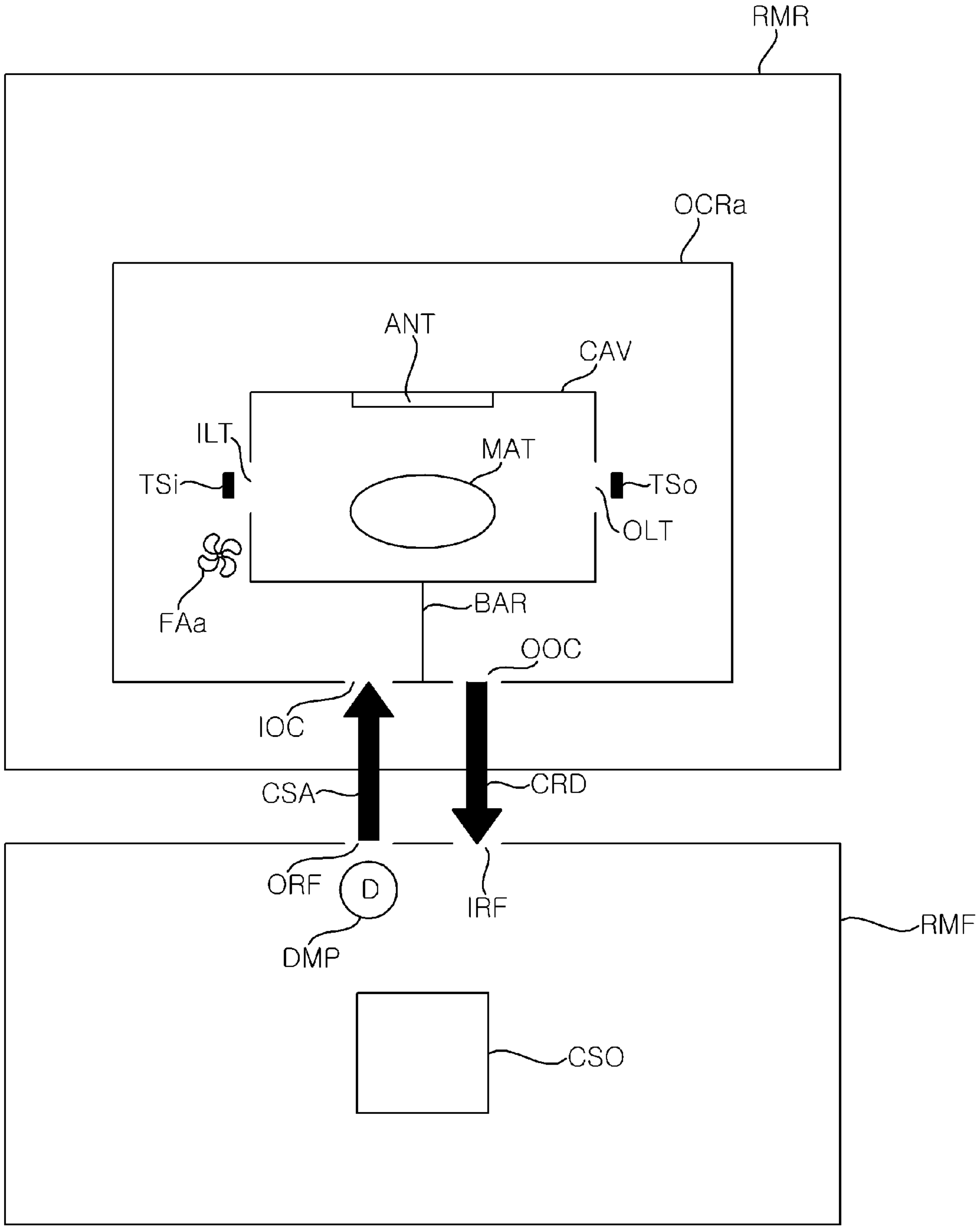

First, FIG. 15 is a diagram illustrating an example of the supercooling chamber OCRa disposed in the refrigerating compartment RMR.

Referring to FIG. 15, the supercooling chamber OCRa may include the cavity CAV which is disposed in the supercooling chamber OCRa and in which goods MAT are placed therein, the inlet temperature detector Tsi which detects the temperature of the inlet ILT of the cavity CAV, the outlet temperature detector Tso which detects the temperature of the outlet OLT of the cavity CAV, the cold supply device 180 which supplies or blocks the cold to the cavity CAV, and the heat supply device 190 which supplies or blocks the heat into the CAV. Accordingly, it may be possible to efficiently maintain the supercooling using the RF output without disposing a temperature detector in the cavity.

The cold supply device 180 may include the fan FAa disposed at the inlet ILT of the cavity CAV.

Meanwhile, the controller 310 may control the supply of cold supplied to the cavity CAV through on/off control of the fan FAa.

The heat supply device 190 may include the RF output device 190a which outputs the RF. In particular, an antenna (ANT) for outputting an RF may be disposed above the cavity CAV.

Meanwhile, the supercooling chamber OCRa may further include a partition wall BAR separating an inlet IOC of the supercooling chamber OCRa and an outlet OOC of the supercooling chamber OCRa.

Accordingly, the cold from the freezer compartment RMF does not flow from the inlet IOC of the supercooling chamber OCRa to the outlet OOC of the supercooling chamber OCRa.

The freezer compartment RMF may include a cold output device CSO, a damper DMP, a cold supply duct CSA, and a cold recovery duct CRD.

Here, the cold output device CSO may include a heat exchanger which is heat exchanged by driving a compressor, a fan that supplies cold which is heat exchanged in the heat exchanger, or a thermoelectric module.

The cold from the freezer compartment RMF is transferred to the inlet IOC in the supercooling chamber OCRa via the outlet ORF and cold supply duct CSA for cold output of the freezer compartment RMF.

The cold from the outlet OOC in the supercooling chamber OCRa is transferred to the cold recovery duct CRD and to an inlet IRF for the cold input of the freezer compartment RMF.

The damper DMP may be disposed inside the supercooling chamber OCRa, unlike the drawing.

The supercooling chamber OCRa is insulated from the outside and is also preferably insulated from the inside cavity CAV. To this end, it is preferable that a heat insulating material is attached to the inner surface of the supercooling chamber OCRa.

Meanwhile, it is preferable that a heat insulating material is also attached to the inner surface of the cavity CAV.

Meanwhile, when the supercooling chamber OCRa is disposed in the refrigerating compartment RMR, the cold supply device 180 according to the embodiment of the present disclosure may further include the cold supply duct CSA which supplies cold to the inlet IOC of the supercooling chamber OCRa, and the cold recovery duct CRD which is disposed in the freezer compartment RMF to recover the cold from the outlet OOC of the supercooling chamber OCRa.

Meanwhile, the cold supply device 180 according to the present disclosure may further include the damper DMP that is operated to supply cold to the cold supply duct CSA.

The controller 310 may control the supply of the cold supplied to the supercooling chamber OCRa by controlling an opening or opening rate of the damper DMP.

Figure 16:
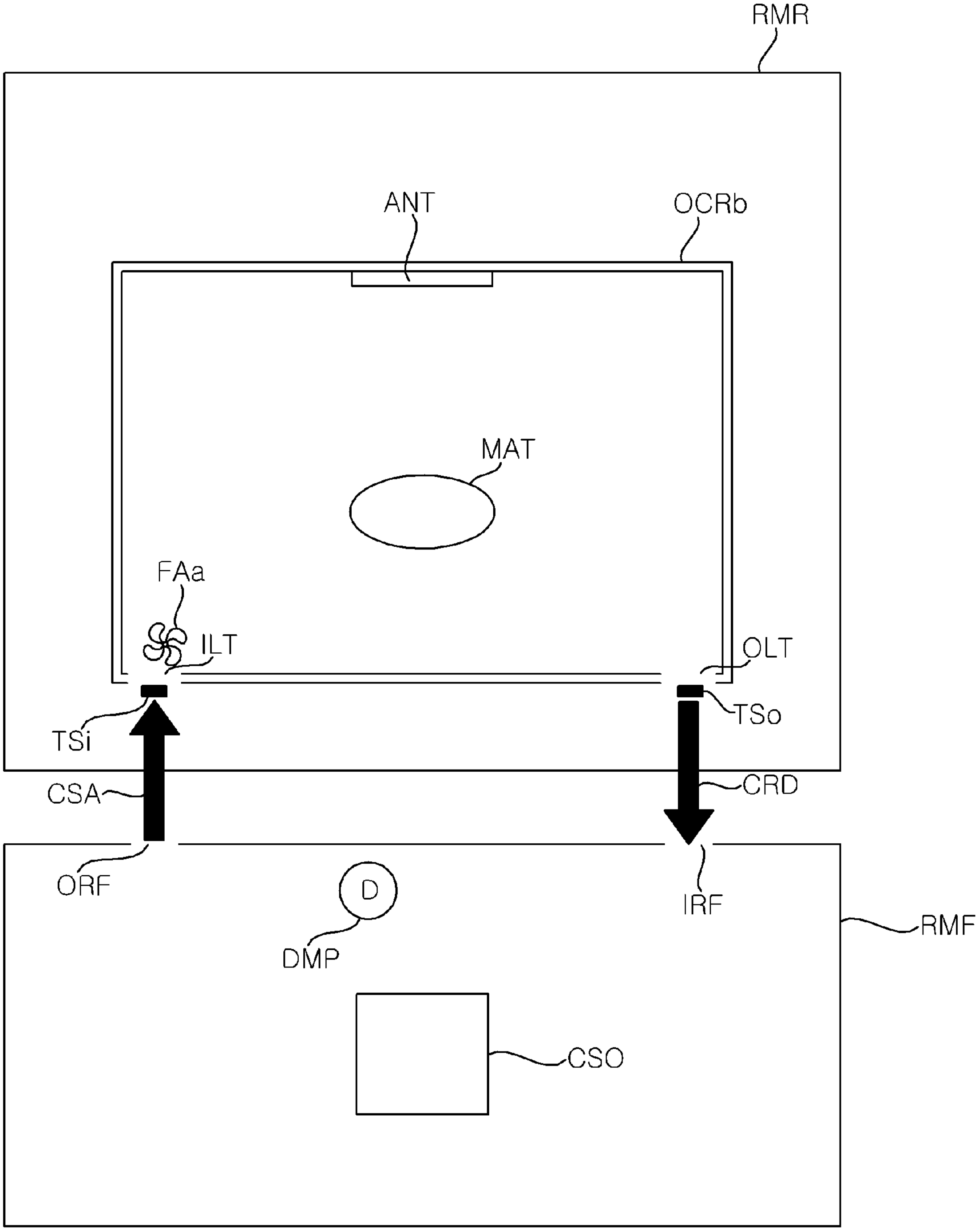

Next, FIG. 16 is a diagram illustrating another example of a supercooling chamber OCRb disposed in the refrigerating compartment RMR.

Referring to FIG. 16, unlike the supercooling chamber OCRa of FIG. 15, in the supercooling chamber OCRb of FIG. 16, the partition wall BAR and the like are not disclosed.

The supercooling chamber OCRb may include the cavity CAV which is disposed in the supercooling chamber OCRb and in which goods MAT are placed therein, the inlet temperature detector Tsi which detects the temperature of the inlet ILT of the cavity CAV, and the outlet temperature detector Tso which detects the temperature of the outlet OLT of the cavity CAV.

Meanwhile, since a space between the supercooling chamber OCRb and the cavity CAV is insufficient compared to FIG. 15, the fan FAa may be disposed inside the cavity CAV.

Moreover, the inlet and outlet of the cavity CAV may be used as the inlet and outlet of the supercooling chamber OCRb.

Accordingly, the cold from the freezer compartment RMF is transferred to the inlet ILT of the cavity CAV via the outlet ORF and cold supply duct CSA for cold output of the freezer compartment RMF.

Meanwhile, the cold from the outlet OLT of the cavity CAV is transferred to the cold recovery duct CRD and the inlet IRF for the cold input of the freezer compartment RMF.

Meanwhile, the controller 310 may control the supply of cold supplied to the supercooling chamber OCRb by controlling the opening or opening rate of the damper DMP.

Figure 17:
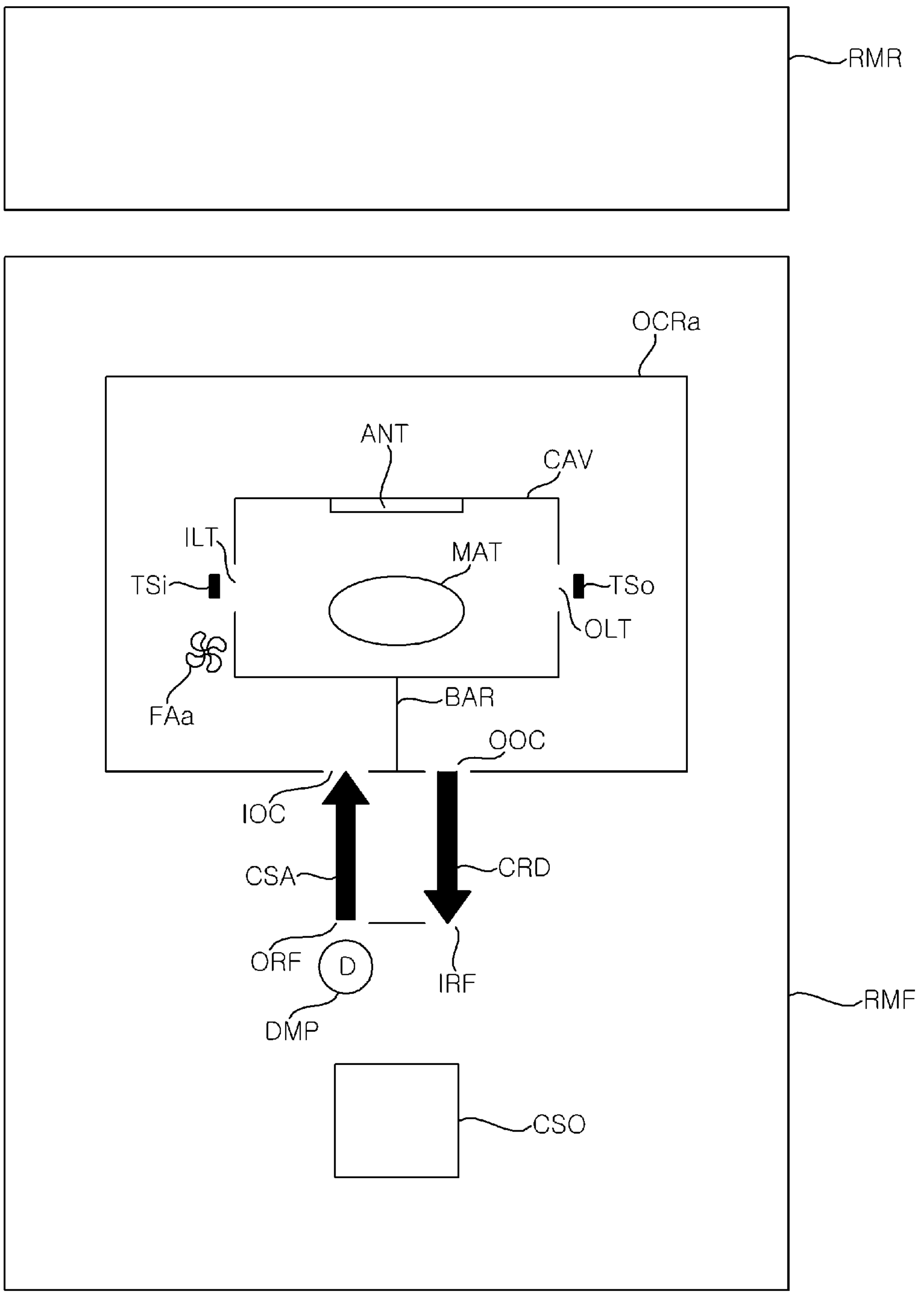

Next, FIG. 17 is a diagram illustrating an example of the supercooling chamber OCRa disposed in a freezer compartment RMF.

Referring to FIG. 17, the supercooling chamber OCRa may include the cavity CAV which is disposed in the supercooling chamber OCRa and in which the goods MAT are placed therein, the inlet temperature detector Tsi which detects the temperature of the inlet ILT of the cavity CAV, the outlet temperature detector Tso which detects the temperature of the outlet OLT of the cavity CAV, the cold supply device 180 which supplies or blocks the cold to the cavity CAV, and the heat supply device 190 which supplies or blocks the heat into the CAV. Accordingly, it may be possible to efficiently maintain the supercooling using the RF output without disposing a temperature detector in the cavity.

The cold supply device 180 may include the fan FAa disposed at the inlet ILT of the cavity CAV.

Meanwhile, the controller 310 may control the supply of cold supplied to the cavity CAV through on/off control of the fan FAa.

The heat supply device 190 may include the RF output device 190*a* that outputs the RF. In particular, an antenna (ANT) for outputting the RF may be disposed above the cavity CAV.

Meanwhile, the supercooling chamber OCRa may further include the partition wall BAR separating the inlet IOC of the supercooling chamber OCRa and the outlet OOC of the supercooling chamber OCRa.

Accordingly, the cold from the freezer compartment RMF does not flow from the inlet IOC of the supercooling chamber OCRa to the outlet OOC of the supercooling chamber OCRa.

The freezer compartment RMF may include the cold output device CSO, the damper DMP, the cold supply duct CSD, and the cold recovery duct CRD.

Here, the cold output device CSO may include a heat exchanger which is heat exchanged by driving a compressor, a fan that supplies cold which is heat exchanged in the heat exchanger, or a thermoelectric module.

The cold from the cold output device CSO and the damper DMP is transferred to the inlet IOC in the supercooling chamber OCRa via the cold supply duct CSA.

The cold from the outlet OOC in the supercooling chamber OCRa is transferred to the inside of the freezer compartment RMF through the cold recovery duct CRD.

The damper DMP may be disposed inside the supercooling chamber OCRa, unlike the drawing.

The supercooling chamber OCRa is insulated from the outside and is also preferably insulated from the inside cavity CAV. To this end, it is preferable that a heat insulating material is attached to the inner surface of the supercooling chamber OCRa.

Meanwhile, it is preferable that a heat insulating material is also attached to the inner surface of the cavity CAV.

Figure 18:
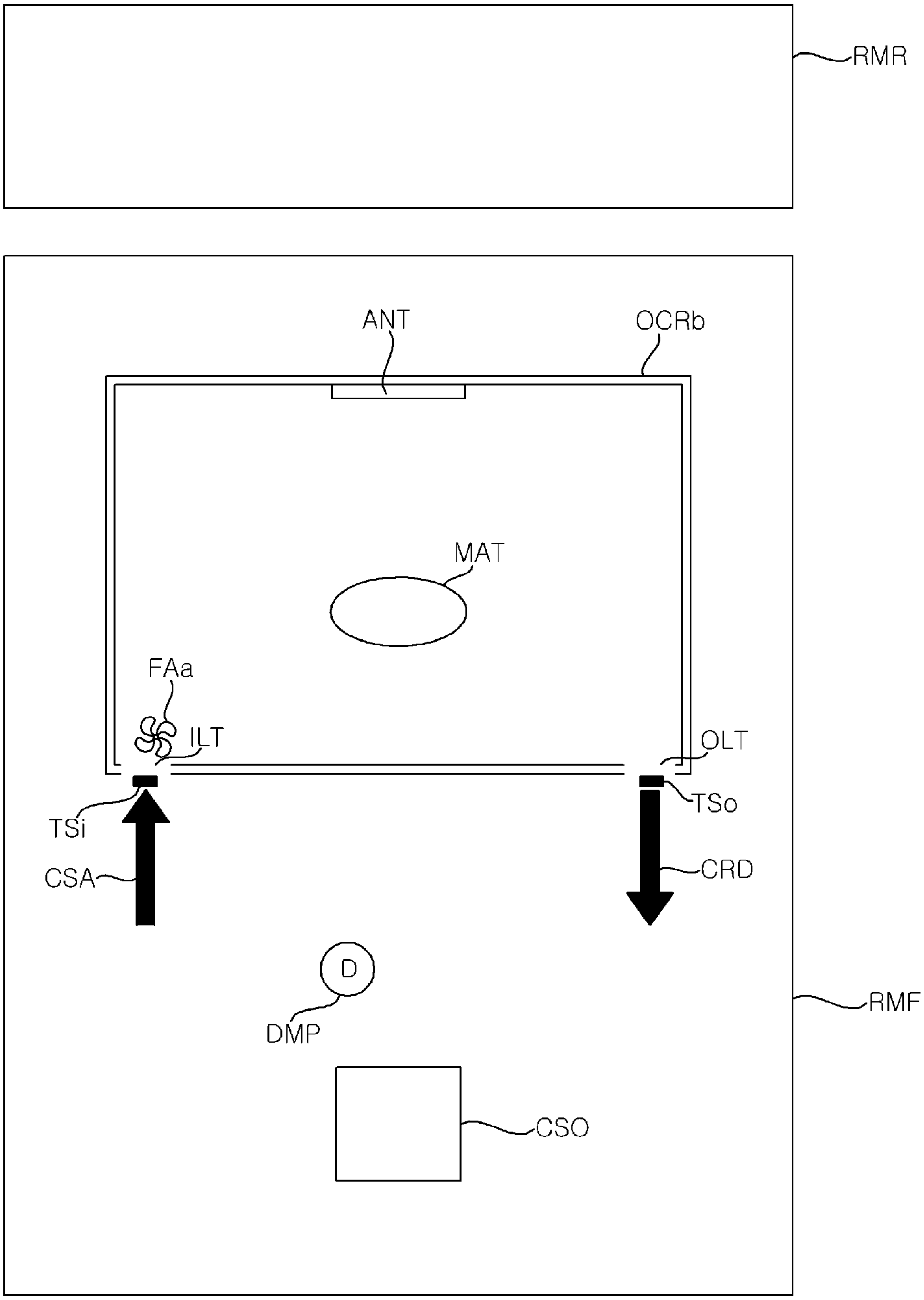

Next, FIG. 18 is a diagram illustrating another example of the supercooling chamber OCRa disposed in the freezer compartment RMF.

Referring to FIG. 18, unlike the supercooling chamber OCRa of FIG. 17, in the supercooling chamber OCRb of FIG. 18, the partition wall BAR and the like are not disclosed.

The supercooling chamber OCRb may include the cavity CAV which is disposed in the supercooling chamber OCRb and in which the goods MAT are placed therein, the inlet temperature detector Tsi which detects the temperature of the inlet ILT of the cavity CAV, and the outlet temperature detector Tso which detects the temperature of the outlet OLT of the cavity CAV.

Meanwhile, since the space between the supercooling chamber OCRb and the cavity CAV is insufficient compared to FIG. 17, the fan FAa may be disposed inside the cavity CAV.

Moreover, the inlet and outlet of the cavity CAV may be used as the inlet and outlet of the supercooling chamber OCRb.

Accordingly, the cold from the cold output device CSO and the damper DMP is transferred to the inlet ILT of the cavity CAV via the cold supply duct CSA for cold output of the freezer compartment RMF.

Meanwhile, the cold from the outlet OLT of the cavity CAV is transferred to the freezer compartment RMF through the cold recovery duct CRD.

Figure 19:
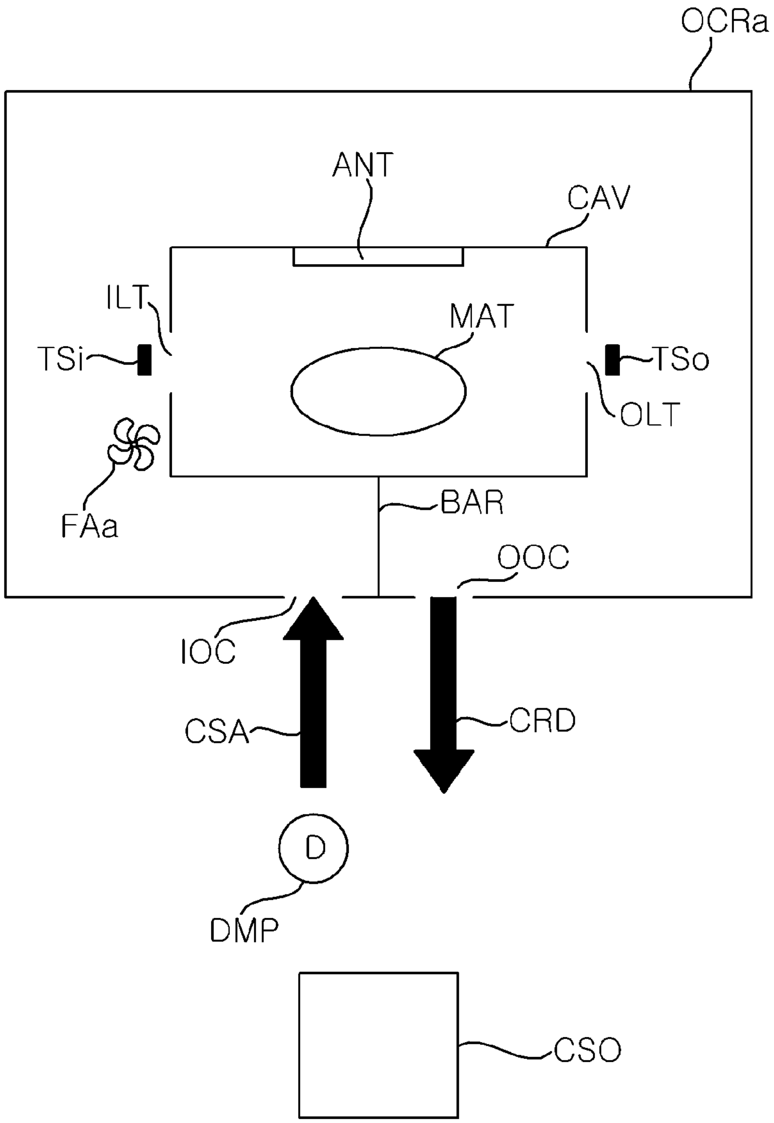

FIG. 19 is a diagram illustrating an example of the supercooling chamber OCRa according to an embodiment of present disclosure.

Referring to FIG. 19, the supercooling chamber OCRa according to the embodiment of the present disclosure may be provided in the refrigerator as a separate module, and not provided in the refrigerating compartment or freezer compartment.

Referring to FIG. 19, similar to FIG. 15 or 17, the supercooling chamber OCRa may include the cavity CAV which is disposed in the supercooling chamber OCRa and in which the goods MAT are placed therein, the inlet temperature detector Tsi which detects the temperature of the inlet ILT of the cavity CAV, the outlet temperature detector Tso which detects the temperature of the outlet OLT of the cavity CAV, the cold supply device 180 which supplies or blocks the cold to the cavity CAV, and the heat supply device 190 which supplies or blocks the heat into the CAV. Accordingly, it may be possible to efficiently maintain the supercooling using the RF output without disposing a temperature detector in the cavity.

The cold supply device 180 may include the fan FAa disposed at the inlet ILT of the cavity CAV.

Meanwhile, the controller 310 may control the supply of cold supplied to the cavity CAV through on/off control of the fan FAa.

The heat supply device 190 may include an RF output device 190*a* that outputs an RF. In particular, the antenna (ANT) for outputting the RF may be disposed above the cavity CAV.

Meanwhile, the supercooling chamber OCRa may further include the partition wall BAR separating the inlet IOC of the supercooling chamber OCRa and the outlet OOC of the supercooling chamber OCRa.

Accordingly, the cold from the freezer compartment RMF does not flow from the inlet IOC of the supercooling chamber OCRa to the outlet OOC of the supercooling chamber OCRa.

Meanwhile, the cold from the cold output device CSO and the damper DMP is transferred to the inlet IOC in the supercooling chamber OCRa via the cold supply duct CSA.

The cold from the outlet OOC in the supercooling chamber OCRa is transferred to the inside of the freezer compartment RMF through the cold recovery duct CRD.

Figure 20:
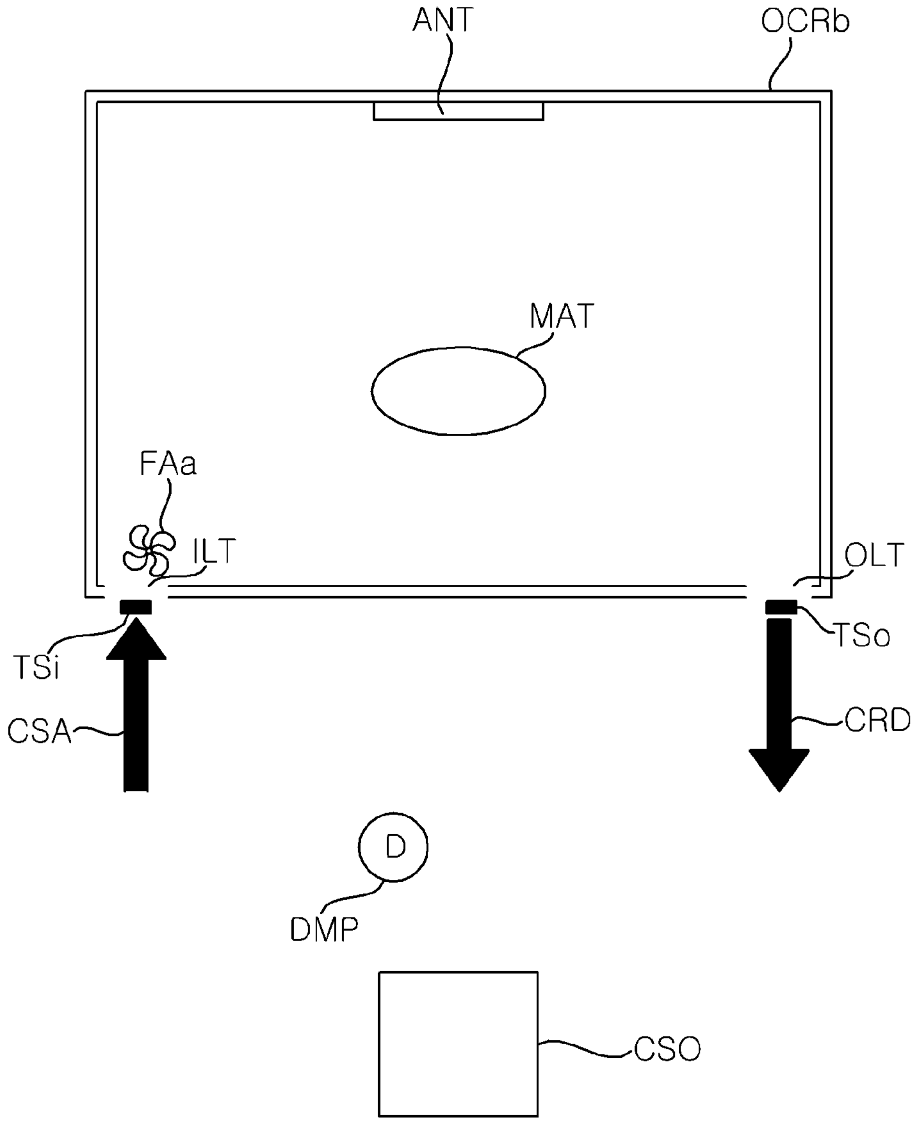

FIG. 20 is a diagram illustrating another example of the supercooling chamber OCRb according to an embodiment of present disclosure.

Referring to FIG. 20, the supercooling chamber OCRb according to the embodiment of the present disclosure may be provided in the refrigerator 100 as a separate module, and not provided in the refrigerating compartment or freezer compartment.

Referring to FIG. 20, unlike the supercooling chamber OCRa of FIG. 19, in the supercooling chamber OCRb of FIG. 20, the partition wall BAR and the like are not disclosed.

The supercooling chamber OCRb may include the cavity CAV which is disposed in the supercooling chamber OCRb and in which goods MAT are placed therein, the inlet temperature detector Tsi which detects the temperature of the inlet ILT of the cavity CAV, and the outlet temperature detector Tso which detects the temperature of the outlet OLT of the cavity CAV.

Meanwhile, since the space between the supercooling chamber OCRb and the cavity CAV is insufficient compared to FIG. 19, the fan FAa may be disposed inside the cavity CAV.

Moreover, the inlet and outlet of the cavity CAV may be used as the inlet and outlet of the supercooling chamber OCRb.

Accordingly, the cold from the cold output device CSO and the damper DMP is transferred to the inlet ILT of the cavity CAV via the cold supply duct CSA for cold output of the freezer compartment RMF.

Meanwhile, the cold from the outlet OLT of the cavity CAV is transferred to the freezer compartment RMF via the cold recovery duct CRD.

Meanwhile, the supercooling control method described in FIGS. 9 to 11 may be applied to the structures of various supercooling chambers of FIGS. 15 to 20.

The refrigerators according to present disclosure are not limitedly applicable to the configurations and methods of the above-described embodiments, but the above embodiments may be configured by selectively combining all or some of each of the embodiments so that various modifications can be made.

In addition, although preferred embodiments of the present disclosure have been illustrated and described above, the present disclosure is not limited to the specific embodiments described above, and of course, various modifications can be made by those skilled in the art to which the invention belongs without departing from the gist of the present disclosure claimed in claims, and these modifications should not be individually understood from the technical idea or prospect of the present disclosure.

The present disclosure is applicable to refrigerators, and in particular, to refrigerators capable of efficiently supplying cold or heat until reaching the supercooling maintaining section.

What is claimed is:

1. A refrigerator comprising:
- a first storage compartment to store goods;
- a cavity disposed inside the first storage compartment;
- a heat source to supply heating air to the cavity;
- a cold source to supply cooling air to the cavity;
- a water molecule freezing preventing device to prevent freezing of water contained in the goods; and
- a controller configured to control an output of at least one of the heat source, the cooling air source, or the water molecule freezing preventing device,
- wherein the controller is configured to perform:
- a first operation based on a first set temperature for a first cooling operation of the first storage compartment,
- a second operation based on a second set temperature for a heating operation of the first storage compartment, and a third operation based on a third set temperature for a second cooling operation of the first storage compartment, wherein the second set temperature is higher than 0° C., and the third set temperature is lower than the first set temperature, wherein the controller is configured to:

sequentially decrease a temperature of the goods to the first set temperature in the first operation step, sequentially increase the temperature of the goods to the second set temperature in the second operation step, sequentially decrease a temperature of the goods to the third set temperature in the third operation step, maintain the temperature of the goods within a predetermined range based on the third set temperature after the third operation step, wherein the controller is configured to control a period of the second operation step to be longer than a period of the first operation step.

2. The refrigerator of claim 1, wherein the cold source includes:

an evaporator to perform heat exchange using a refrigerant compressed by a compressor, and a fan to supply cooling air generated by the heat exchange the evaporator to the first storage compartment.

3. The refrigerator of claim 1, wherein the cold source includes:

a thermoelectric element, and a fan to supply cooling air generated by heat exchange a heat absorption surface of the thermoelectric element to the first storage compartment.

4. The refrigerator of claim 1, wherein the controller is configured to change an operation mode of the first storage compartment, and the operation mode includes at least one of a refrigerating operation mode, a supercooling operation mode, or a thawing mode.

5. The refrigerator of claim 4, wherein a set temperature of the first storage compartment in the refrigerating operation mode is higher than a set temperature of the first storage compartment in the supercooling operation mode.

6. The refrigerator of claim 4, wherein a set temperature of the first storage compartment in the refrigerating operation mode is lower than a set temperature of the first storage compartment in the thawing mode.

7. The refrigerator of claim 1, comprising a second storage compartment disposed outside the first storage compartment.

8. The refrigerator of claim 7, wherein a set temperature of the second storage compartment is higher than the first set temperature for the first cooling operation of the first storage compartment and the third set temperature for the second cooling operation of the first storage compartment.

9. The refrigerator of claim 7, comprising a third storage compartment, wherein a set temperature for the third storage compartment is lower than the first set temperature for the first cooling operation of the first storage compartment and the third set temperature for the second cooling operation of the first storage compartment.

10. The refrigerator of claim 1, wherein the controller is configured to control an output of the water molecule freezing preventing device during execution of the second operation to be greater than an output of the water molecule freezing preventing device during execution of the first operation.

11. The refrigerator of claim 1, wherein the controller is configured to control an output of the water molecule freezing preventing device during execution of the third operation to be equal to or greater than an output the water molecule freezing preventing device during execution of the first operation.

12. The refrigerator of claim 1, wherein the controller is configured to perform a fourth operation based on a fourth set temperature for another heating operation of the first storage compartment.

13. The refrigerator of claim 12, wherein the fourth set temperature is higher than 0° C.

14. The refrigerator of claim 12, wherein the controller is configured to control the fourth set temperature to be higher than the second set temperature when a time interval from a time when an operation start condition of the second operation is satisfied to a time when an operation end condition of the second operation-sp is satisfied exceeds a predetermined range.

15. The refrigerator of claim 12, wherein the controller is configured to control the fourth set temperature to be equal to the second set temperature when a times interval from a time when an operation start condition of the second operation is satisfied to a time when an operation end condition of the second operation is satisfied is within a predetermined range.

16. The refrigerator of claim 12, wherein the controller is configured to control the fourth set temperature to be lower than the second set temperature when a time interval from a time when an operation start condition of the second operation is satisfied to a time when an operation end condition of the second operation is satisfied is less than a predetermined range.

17. The refrigerator of claim 12, wherein the controller is configured to control the fourth set temperature to be higher than the second set temperature when a temperature of the first storage compartment exceeds a predetermined range from a time when an operation start condition of the second operation is satisfied to a time when an operation end condition of the second operation is satisfied.

18. The refrigerator of claim 12, wherein the controller is configured to control the fourth set temperature to be equal to the second set temperature when a temperature of the first storage compartment is within a predetermined range from a time when an operation start condition of the second operation is satisfied to a time when an operation end condition of the second operation is satisfied.

19. The refrigerator of claim 12, wherein the controller is configured to control the fourth set temperature to be lower than the second set temperature when a temperature of the first storage compartment less than a predetermined range from a time when an operation start condition of the second operation is satisfied to a time when an operation end condition of the second operation is satisfied.

20. A refrigerator comprising:

a first storage compartment to store goods;

a cavity disposed inside the first storage compartment;

a heat source to supply heating air to the cavity;

a cold source to supply cooling air to the cavity;

a water molecule freezing preventing device to prevent freezing of water contained in the goods; and a controller configured to control an output of at least one of the heat source, the cooling air source, or the water molecule freezing preventing device, wherein the controller is configured to perform:

a first operation based on a first set temperature for a first cooling operation of the first storage compartment, a second operation based on a second set temperature for a heating operation of the first storage compartment, and a third operation based on a third set temperature for a second cooling operation of the first storage compartment, and wherein the controller is configured to control a total amount of cooling air supplied to the first storage compartment in the third operation to be greater than a total amount of cooling air supplied to the first storage compartment in the first operation, wherein the controller is configured to:

sequentially decrease a temperature of the goods to the first set temperature in the first operation step, sequentially increase the temperature of the goods to the second set temperature in the second operation step, sequentially decrease a temperature of the goods to the third set temperature in the third operation step, maintain the temperature of the goods within a predetermined range based on the third set temperature after the third operation step, wherein the controller is configured to control a period of the second operation step to be longer than a period of the first operation step.

* * * * *